(12) United States Patent
McCants, Jr.

(10) Patent No.: US 7,849,778 B1
(45) Date of Patent: Dec. 14, 2010

(54) AIR-BASED VERTICAL LAUNCH BALLISTIC MISSILE DEFENSE

(75) Inventor: Thomas H. McCants, Jr., Fredericksburg, VA (US)

(73) Assignee: BAE Systems Technology Solutions & Services Inc., Rockville, MD (US)

( * ) Notice: Subject to any disclaimer, the term of this patent is extended or adjusted under 35 U.S.C. 154(b) by 87 days.

(21) Appl. No.: 12/430,146

(22) Filed: Apr. 27, 2009

Related U.S. Application Data

(62) Division of application No. 10/556,153, filed on Nov. 7, 2005, now Pat. No. 7,540,227.

(60) Provisional application No. 60/468,850, filed on May 6, 2003.

(51) Int. Cl.
*F41F 3/06* (2006.01)
(52) U.S. Cl. .................... 89/1.815; 89/1.801
(58) Field of Classification Search .............. 89/1.801, 89/1.802, 1.806, 1.807, 1.815; 244/1 TD, 244/118.1, 137.1, 137.4
See application file for complete search history.

(56) References Cited

U.S. PATENT DOCUMENTS

| | | | |
|---|---|---|---|
| 3,018,692 A | 1/1962 | Bilek | |
| 3,077,144 A | 2/1963 | Barker et al. | |
| 4,080,868 A | 3/1978 | Matthews | |
| 4,208,949 A | 6/1980 | Boilsen | |
| 4,256,012 A | 3/1981 | Cowart et al. | |
| 4,307,650 A | 12/1981 | Kuesters et al. | |
| 4,489,638 A | 12/1984 | Bastian et al. | |
| 4,616,554 A | 10/1986 | Spink et al. | |
| 4,995,572 A | 2/1991 | Piasecki | |
| 5,148,734 A | 9/1992 | Lilly | |
| 5,219,133 A | 6/1993 | Christian | |
| 5,398,588 A | 3/1995 | Peck | |
| 5,522,566 A | 6/1996 | Hardy et al. | |
| 5,695,153 A * | 12/1997 | Britton et al. | 244/63 |
| 5,999,652 A | 12/1999 | Bushman | |
| 6,199,470 B1 | 3/2001 | Dewan et al. | |
| 6,394,392 B1 | 5/2002 | Lafferty | |
| 2003/0172832 A1 | 9/2003 | O'Dwyer | |
| 2004/0089767 A1* | 5/2004 | Harrison | 244/137.4 |
| 2006/0065150 A1 | 3/2006 | O'Dwyer | |

FOREIGN PATENT DOCUMENTS

| | | |
|---|---|---|
| DE | 4433349 | 3/1995 |
| JP | 2007083837 | 4/2007 |
| RU | 2011147 | 4/1994 |

* cited by examiner

*Primary Examiner*—Troy Chambers
(74) *Attorney, Agent, or Firm*—Daniel J. Long

(57) ABSTRACT

An air-based vertical launch system is described by means of which ballistic missile defense can be achieved effectively from a large aircraft. A method for ensuring safe missile egress is proposed. A method for ensuring that the missile strikes the ballistic missile payload section is also proposed. Together, the air basing method employing vertical (or near-vertical) launch and semi-active laser guidance yield an affordable and operationally effective missile defense against both tactical and long-range ballistic missiles. The affordability of missile defense is enhanced by the ability of an aircraft equipped with a vertical launcher to simultaneously carry out several defensive and offensive missions and to provide other capabilities such as satellite launch at other times. Methods for employing an aircraft equipped with a vertical (or near-vertical launcher) and one or more of the proposed egress assurance mechanisms in offensive ground attack missions, mine laying, and satellite launch missions are also proposed.

3 Claims, 27 Drawing Sheets

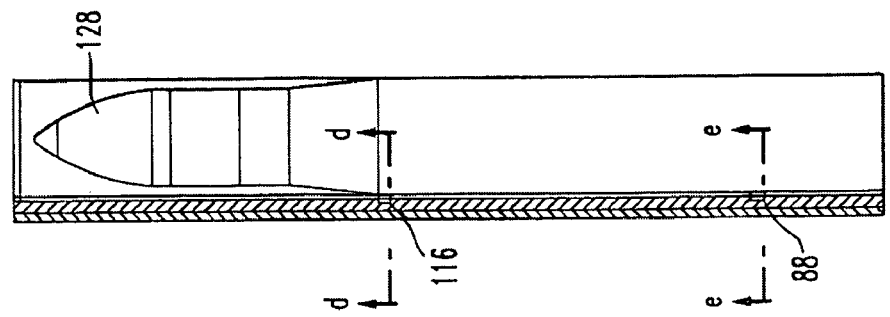
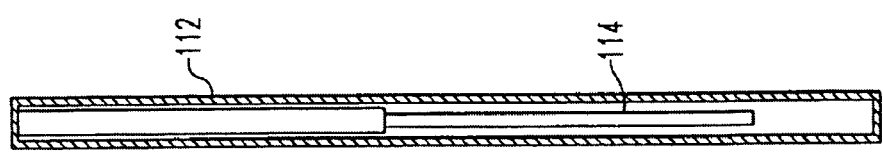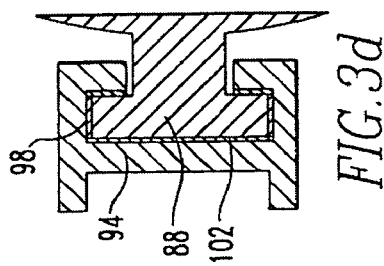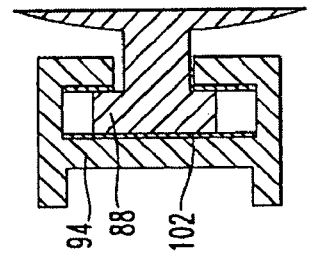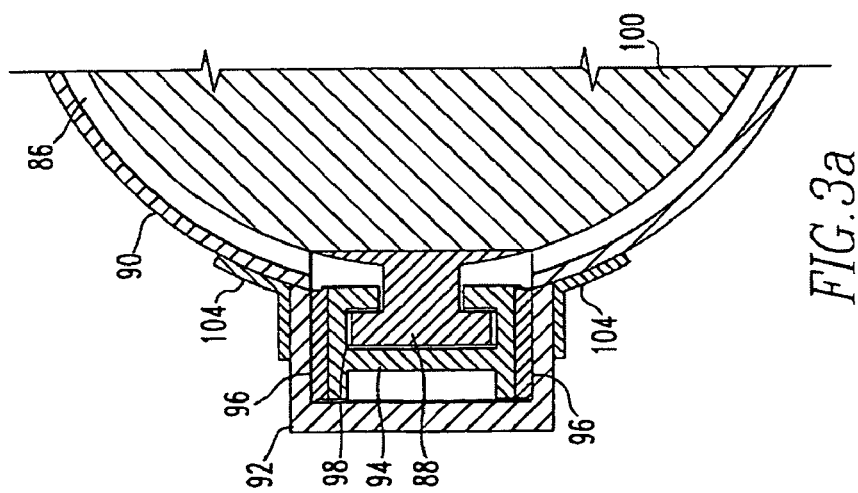

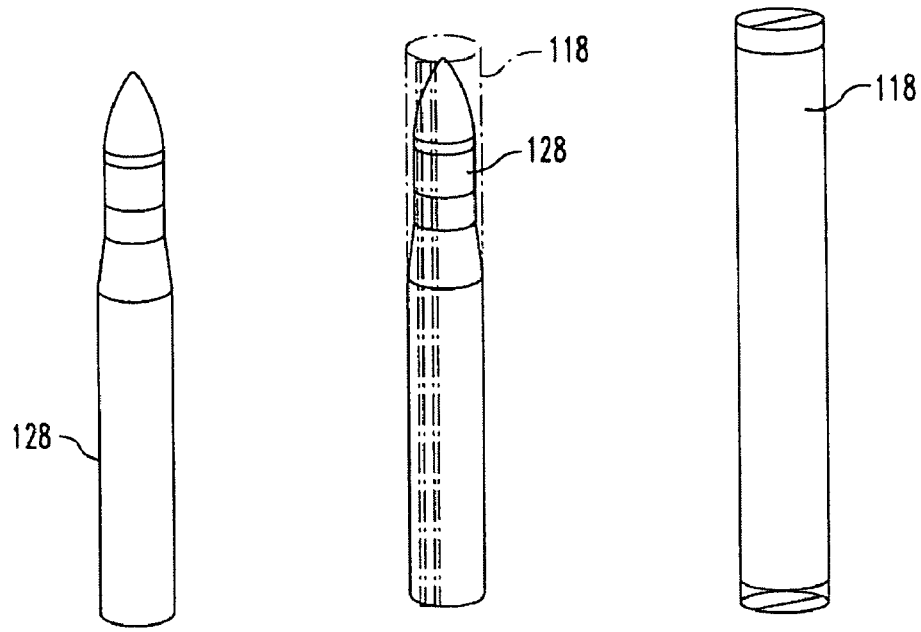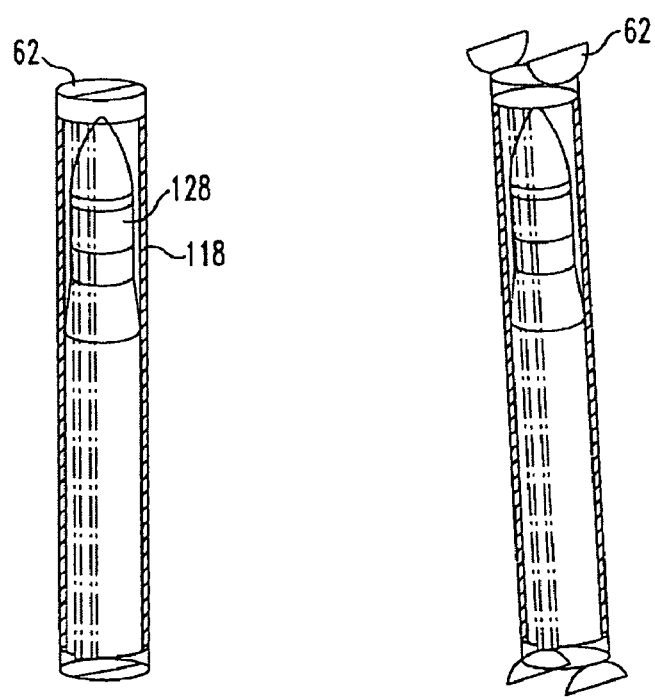
FIG.4a  FIG.4b  FIG.4c
FIG.4d  FIG.4e

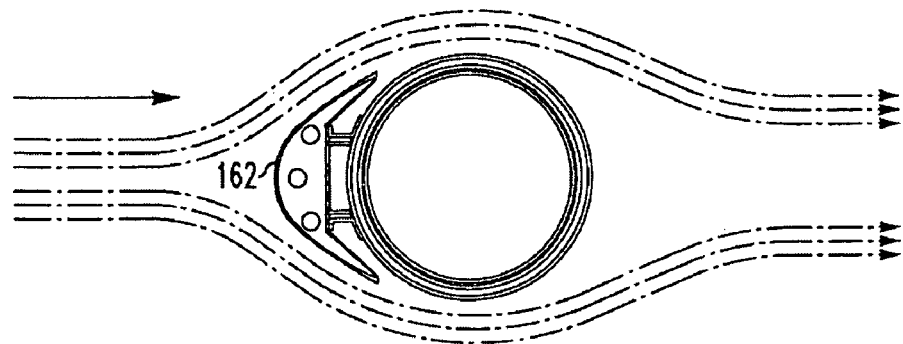
FIG.9a(1)
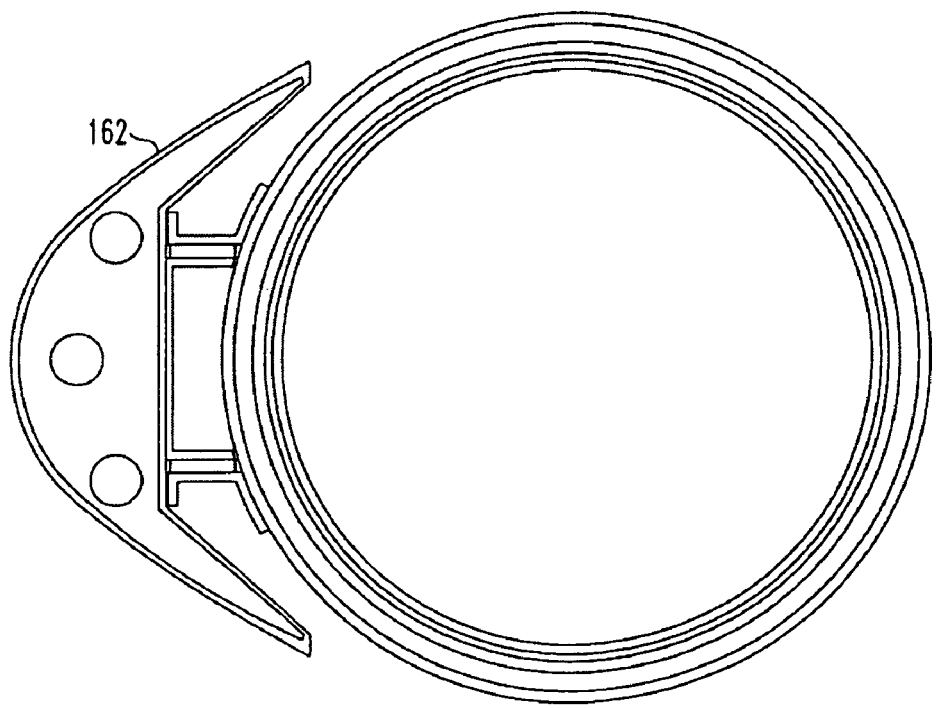
FIG.9a(2)

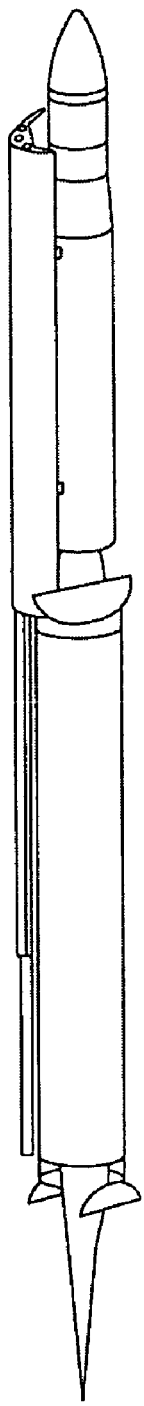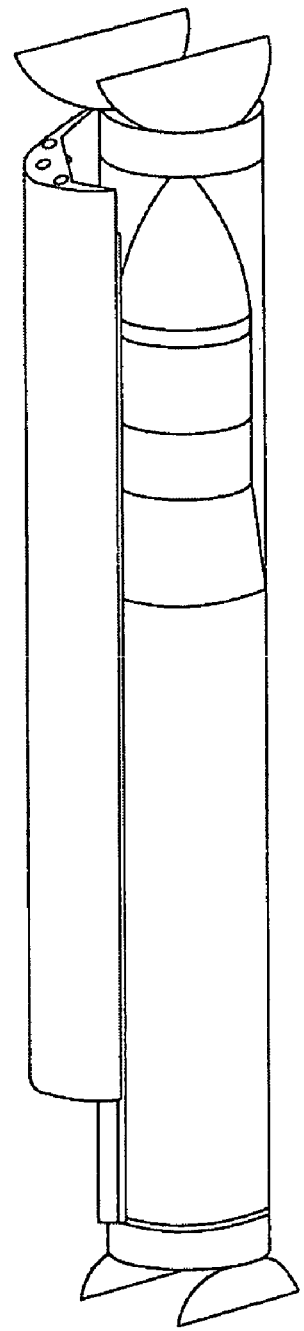
FIG.9a(3)   FIG.9a(4)

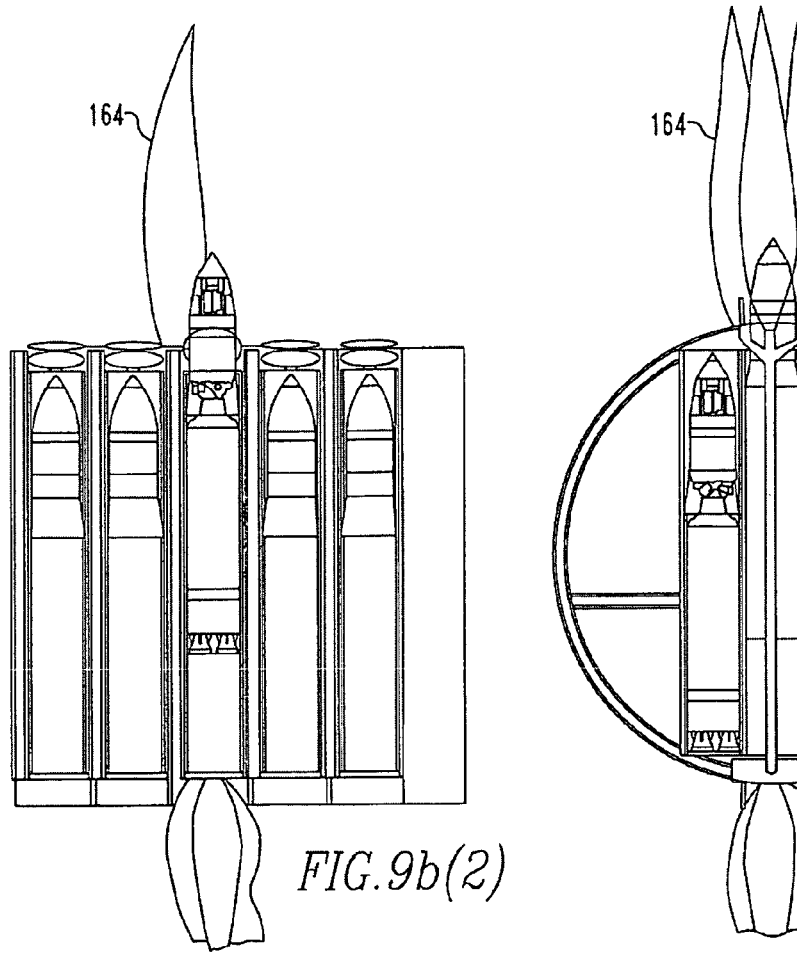
FIG.9b(2)
FIG.9b(3)
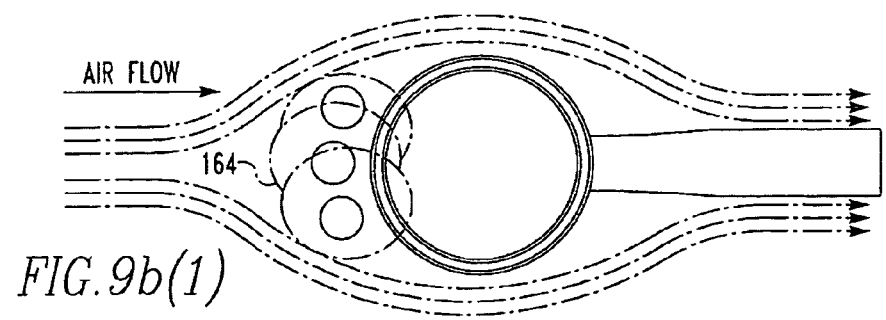
FIG.9b(1)

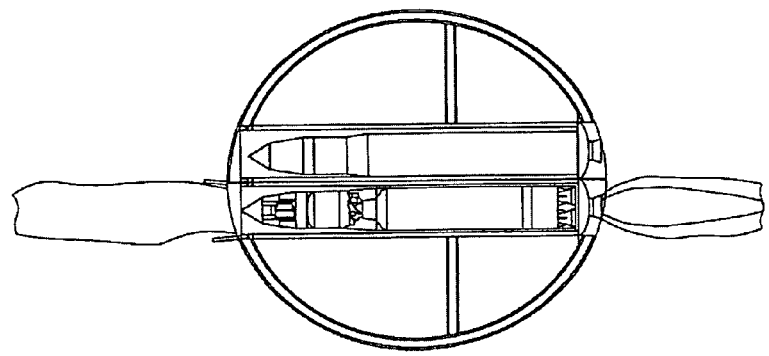
FIG.9c(4)
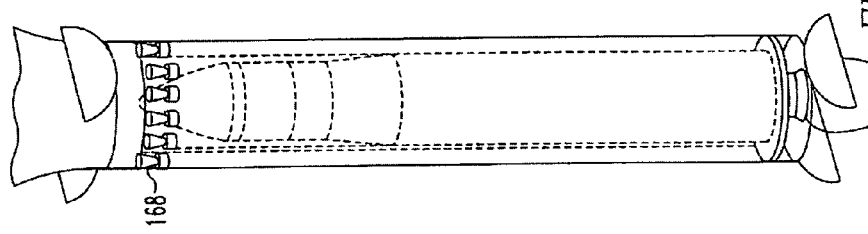
168
FIG.9c(3)
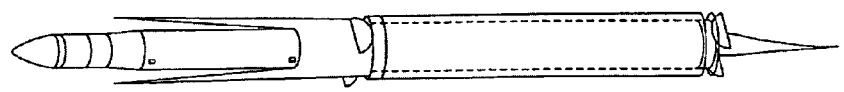
FIG.9c(2)
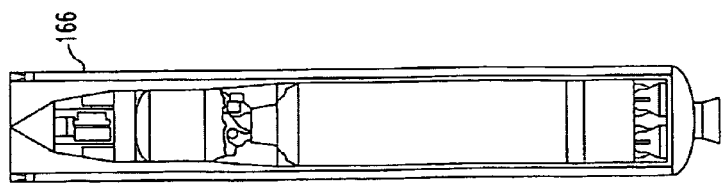
166
FIG.9c(1)

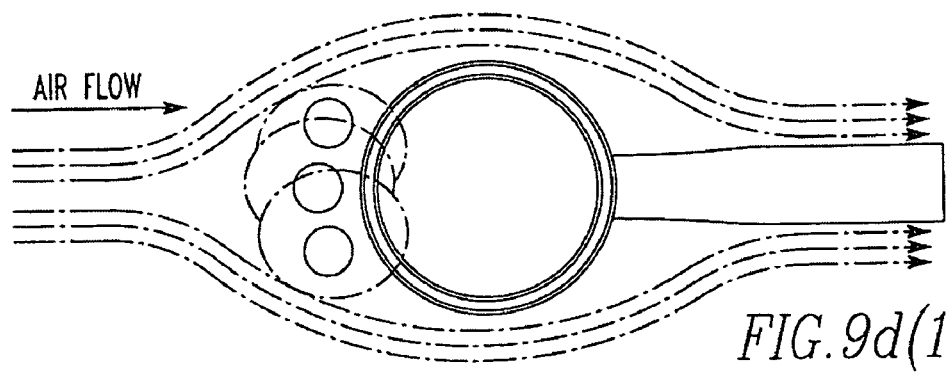
FIG.9d(1)
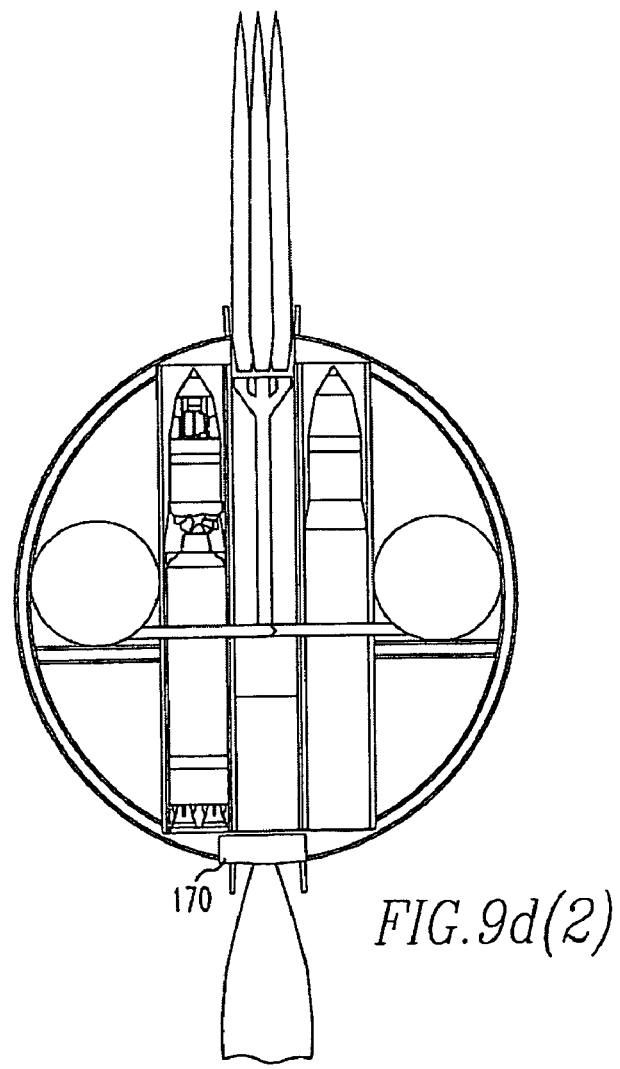
170
FIG.9d(2)

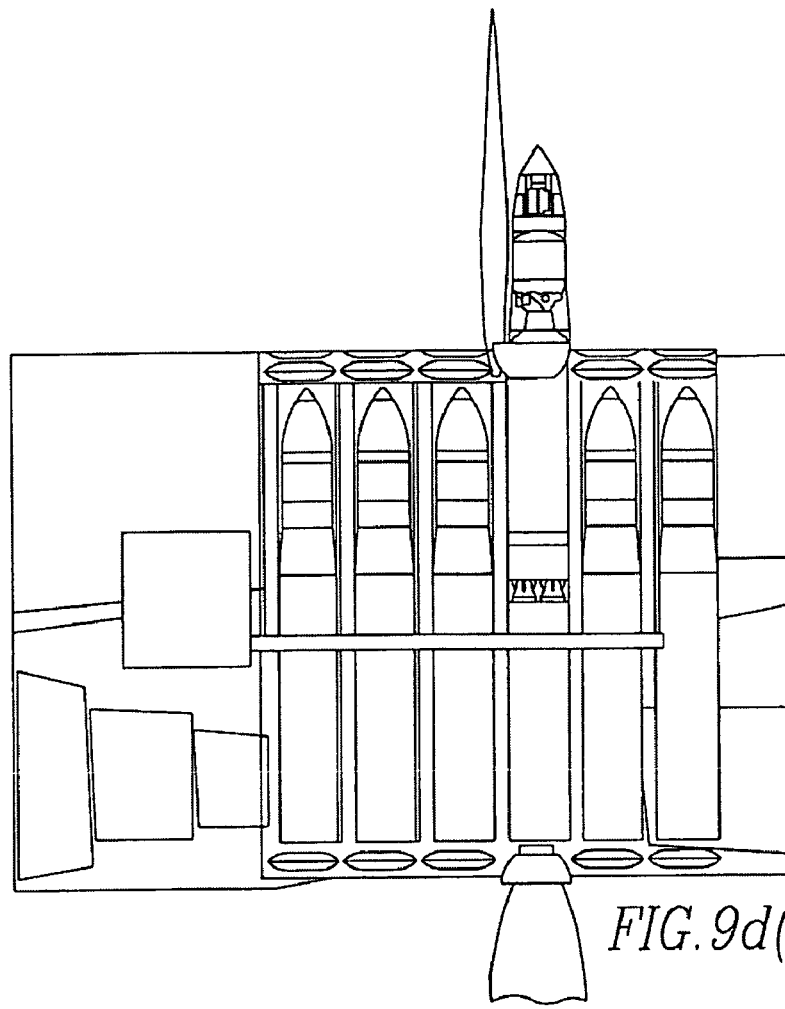
FIG.9d(3)
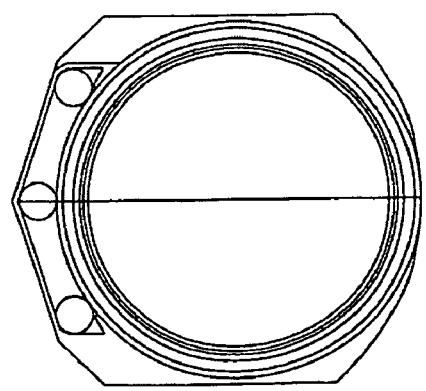
FIG.9d(4)

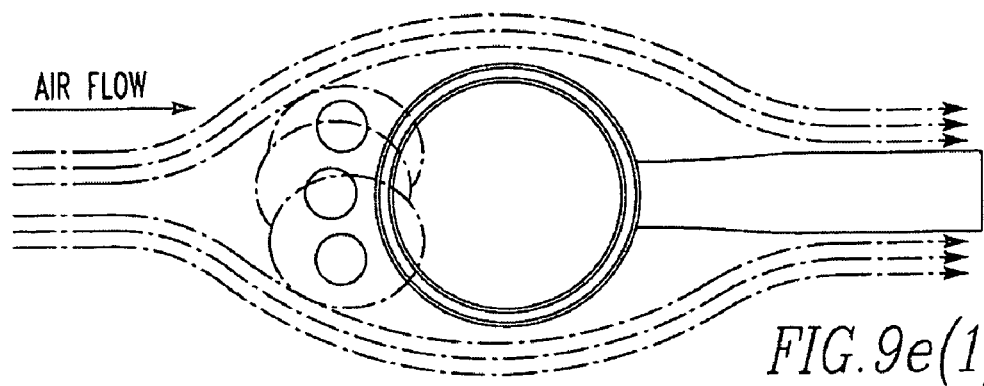
FIG.9e(1)
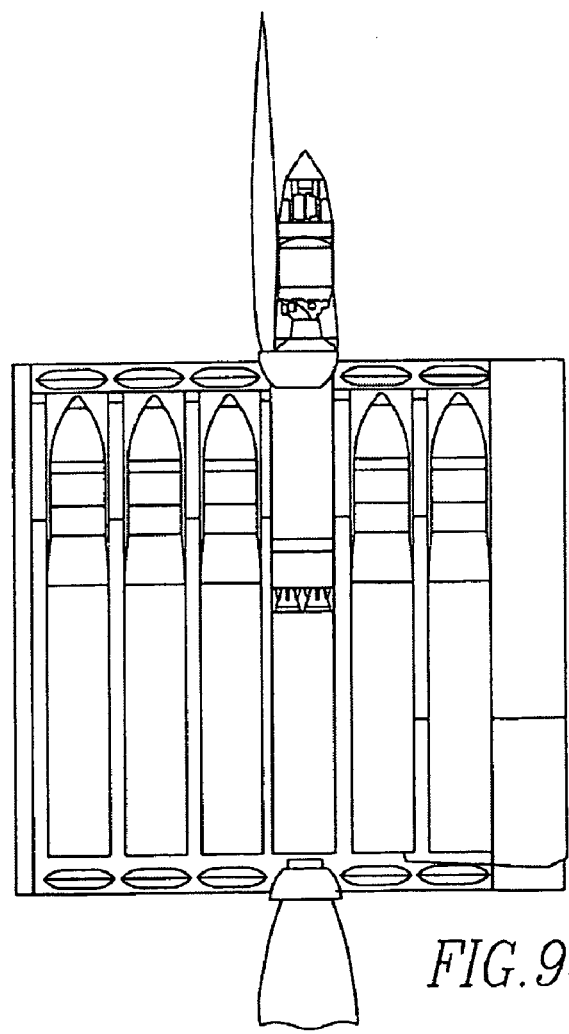
FIG.9e(2)

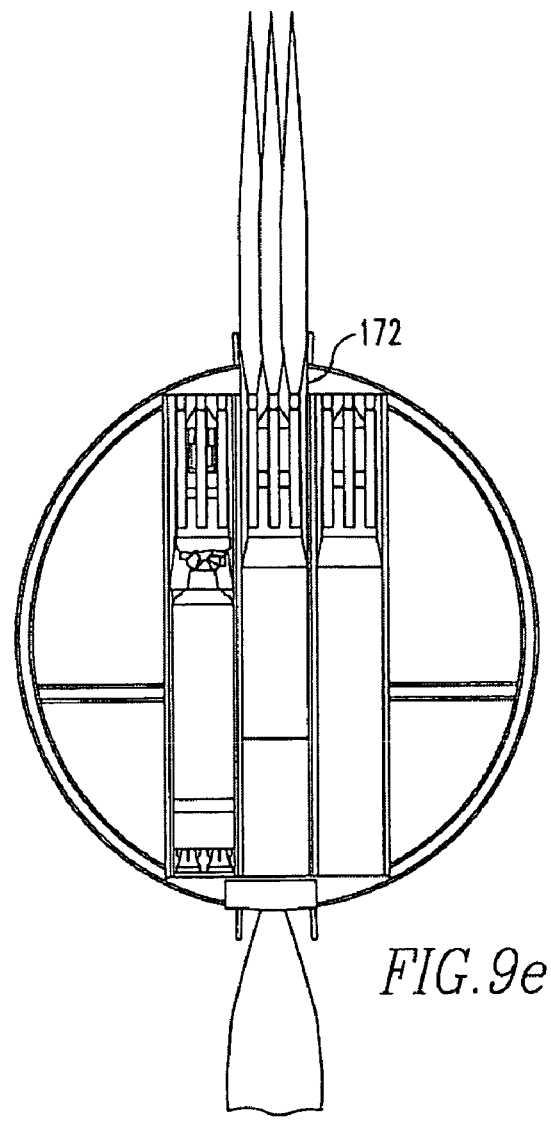
FIG.9e(3)
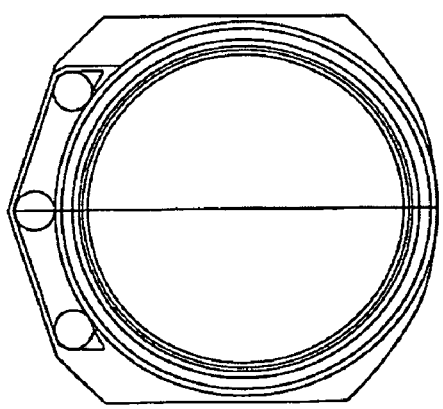
FIG.9e(4)

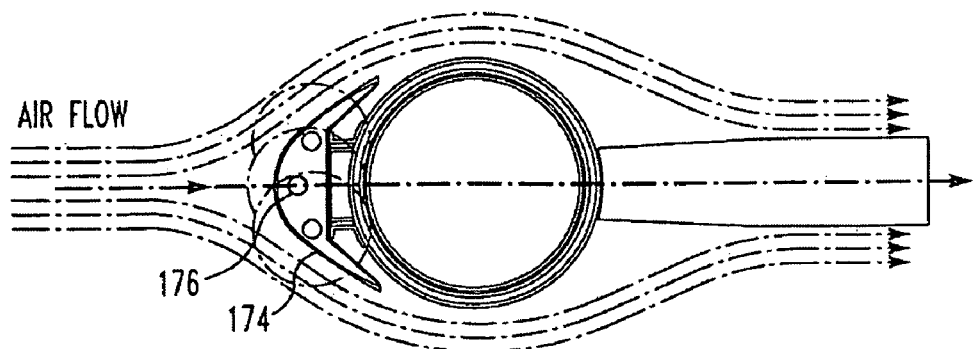
FIG.9f(1)
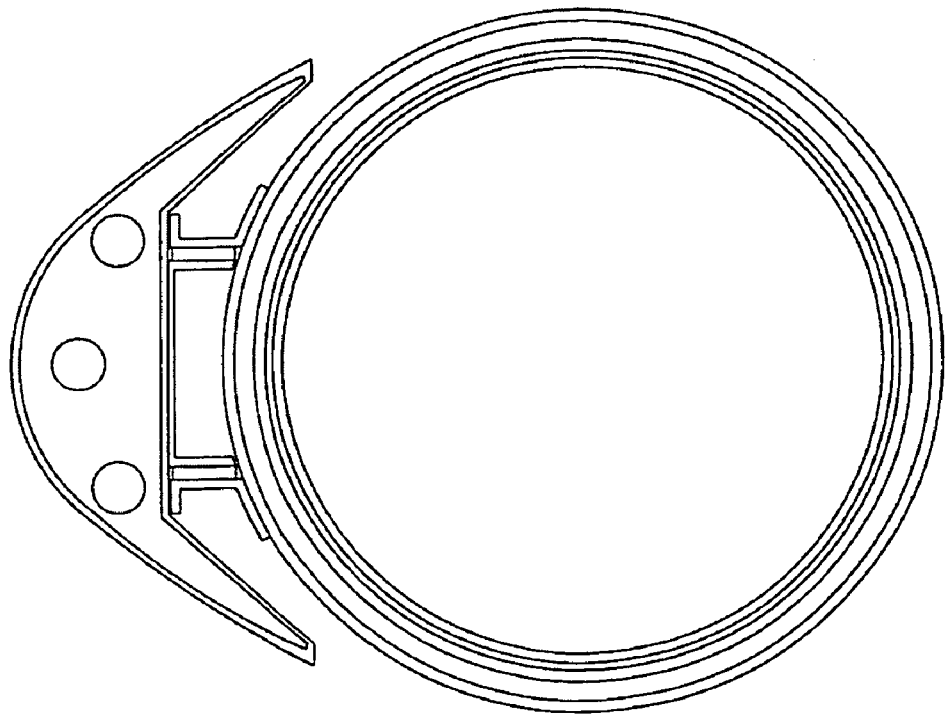
FIG.9f(2)

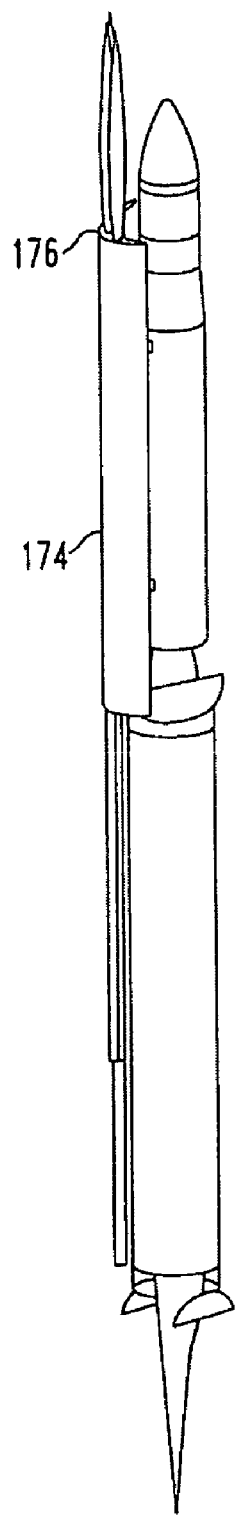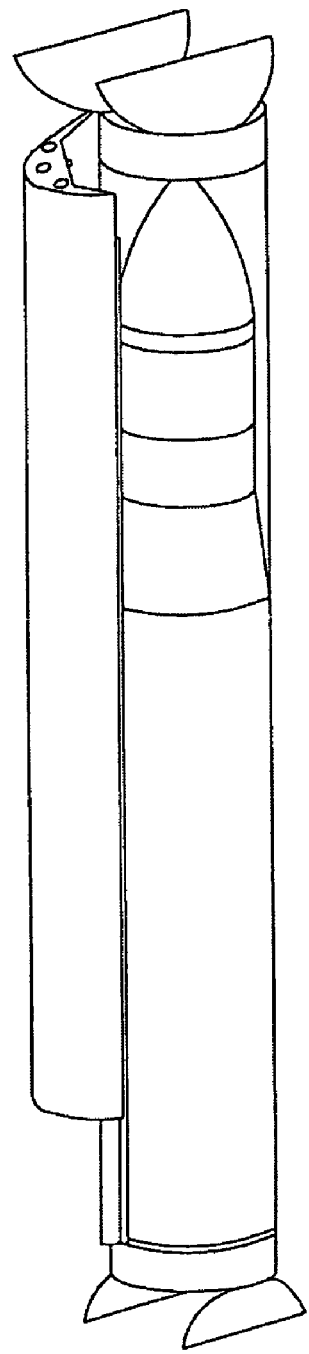
FIG.9f(3)    FIG.9f(4)

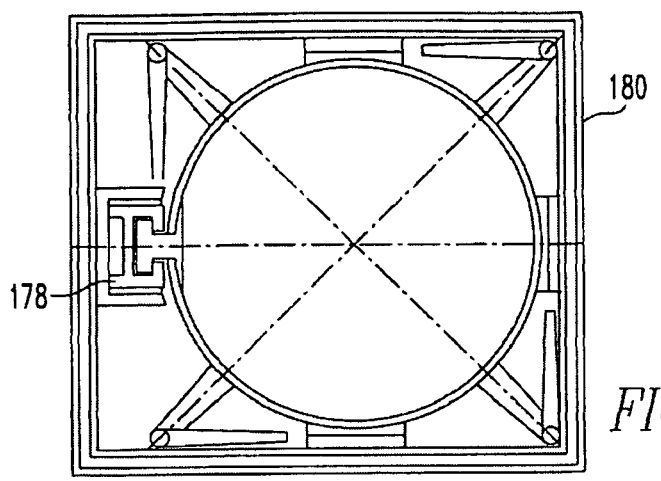
FIG.9g(1)
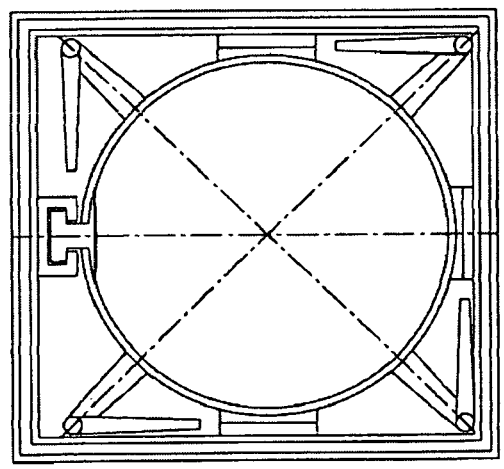
FIG.9g(2)
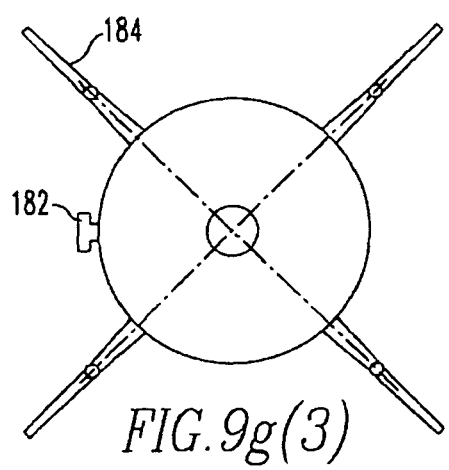
FIG.9g(3)

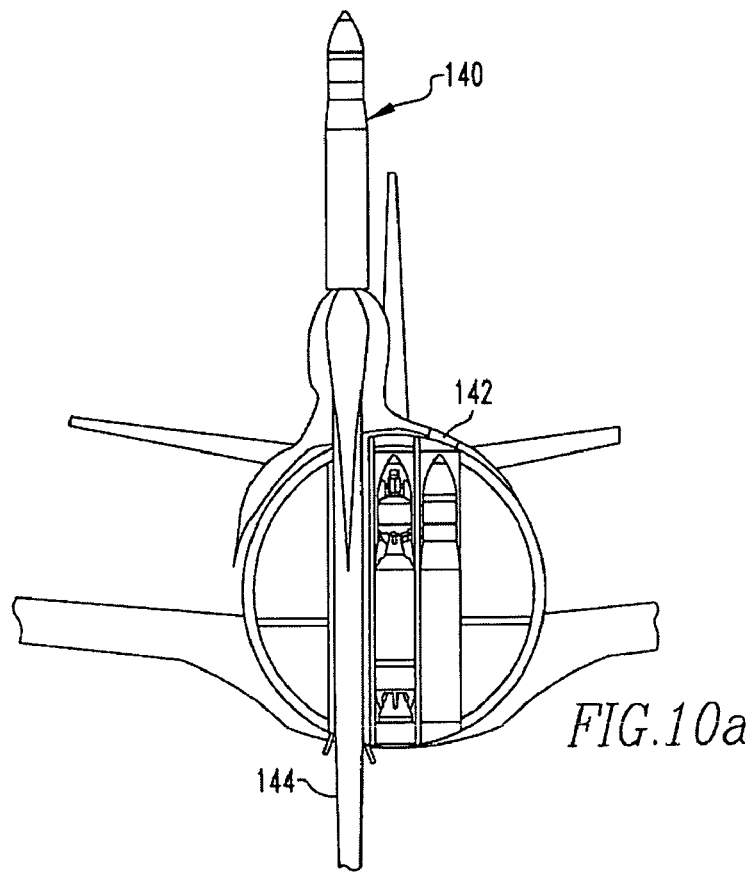
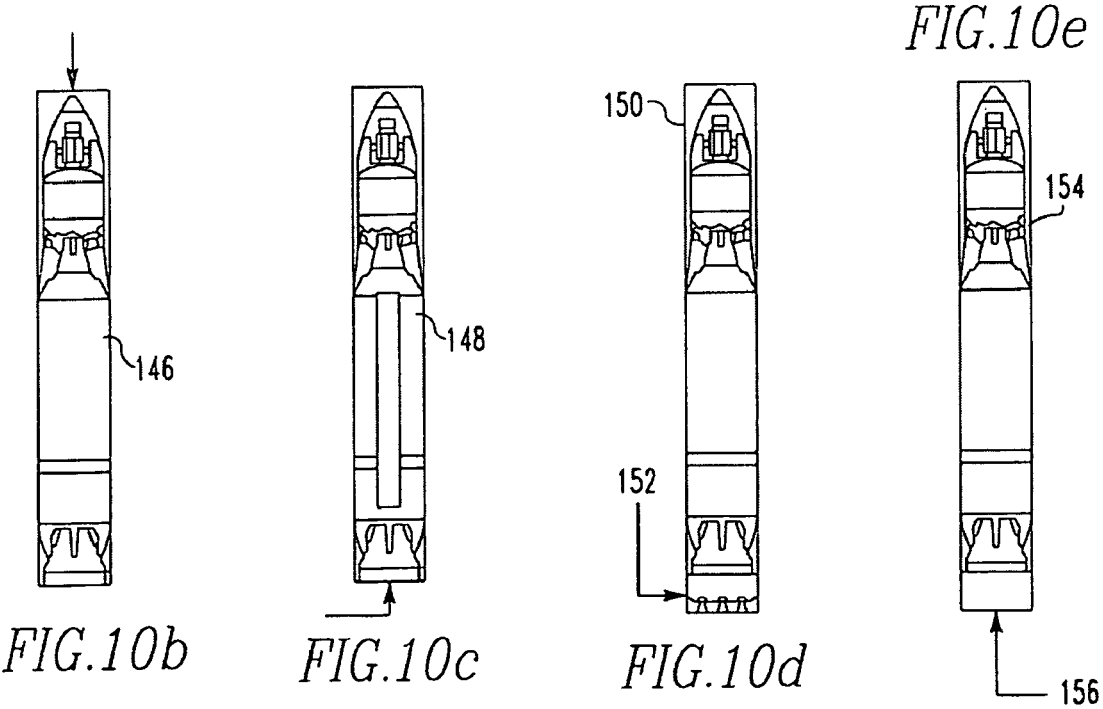
*FIG.10b*  *FIG.10c*  *FIG.10d*

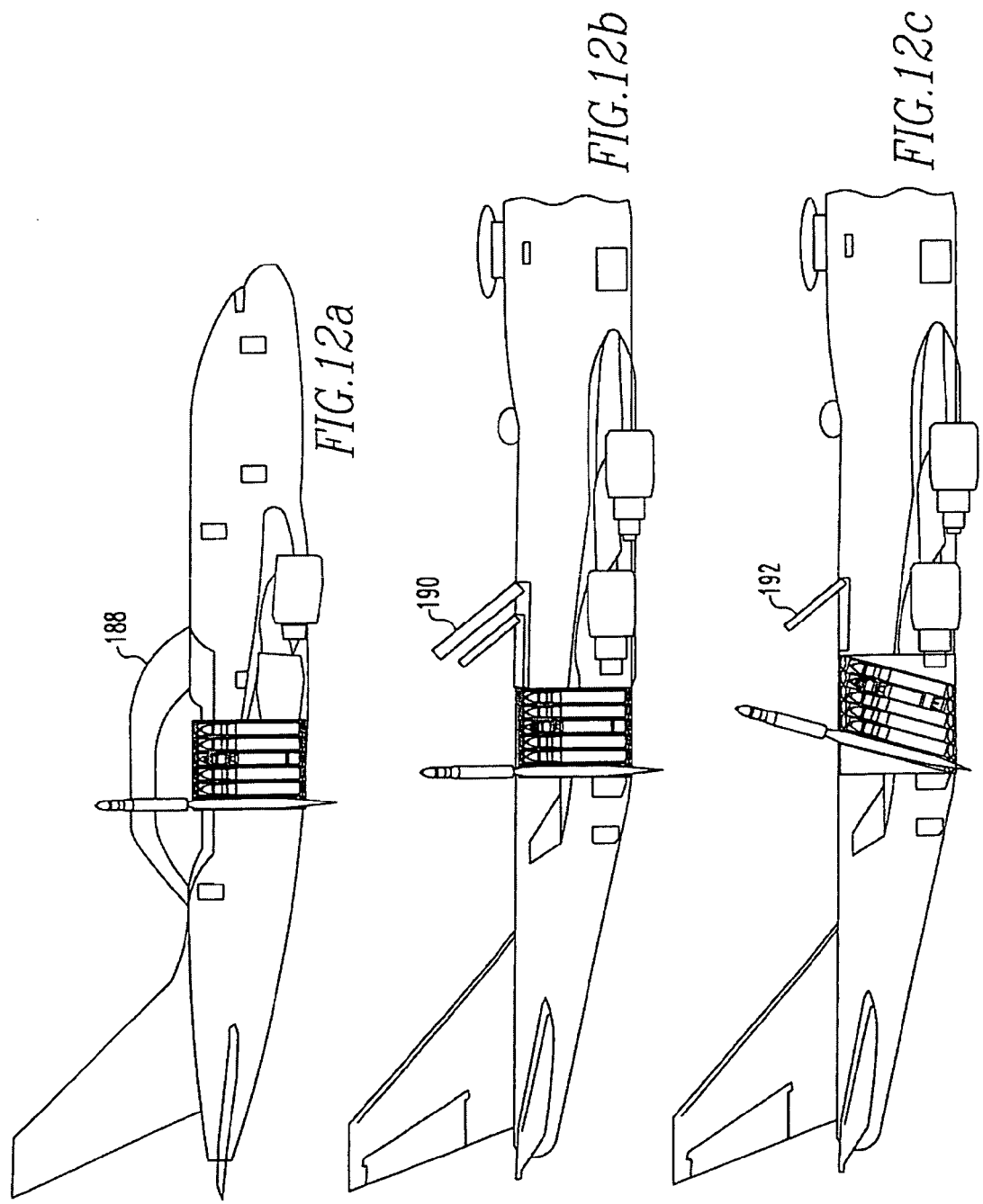

AIR-BASED VERTICAL LAUNCH BALLISTIC MISSILE DEFENSE

CROSS REFERENCE TO RELATED APPLICATIONS

This application is a divisional application of U.S. application Ser. No. 10/556,153 filed Nov. 7, 2005 and also claims rights under 35 USC119 (e) from U.S. Patent Application Ser. No. 60/468,850, filed May 6, 2003, the contents of which are incorporated herein by reference.

BACKGROUND OF THE INVENTION

1. Field of the Invention

The present invention relates to methods and apparatus for launching missiles and more particularly to airborne methods and apparatus for launching missiles.

2. Brief Description of Prior Developments

Surface-based ballistic missile defense concepts for boost or ascent phase intercepts have limitations that severely limit operational utility and impact total system cost. Operational limitations stem from transportation difficulties and politically-derived basing constraints. These in part stem from surface-launched missile design imperatives that force designs to be very large. Methods for employing smaller missiles require numerous launch platforms to meet military requirements and thus have high system deployment and operational costs. Air launch could reduce some of these inhibitors, but conventional air launch modes preclude full exploitation of the potential advantages of air basing. Observation of the inherent difficulties of alternative surface, subsurface, space and air launch modes led to the inventor's consideration of the known benefits of vertical launch as employed in naval ships. Several difficulties for air-based vertical launch that precluded serious consideration in the past are solved by this invention. Given a means to solve air-based vertical launch egress problems, expected benefits appeared achievable and unexpected benefits emerged.

SUMMARY OF INVENTION

The present invention is a method for providing a defense against ballistic missiles. An intercepting missile is first vertically mounted in an aircraft. The ballistic missile is then acquired and tracked. The vertically-mounted intercepting missile is then safely launched through application of one or more air based vertical launch egress assurance mechanisms. The intercepting missile achieves very high velocity by virtue of the high altitude launch and efficient vertical launch trajectory that together maximize the amount of propulsive energy available to accelerate the intercepting missile to a speed adequate to catch the boosting threat. The aircraft then directs the intercepting missile to a position where it can detect, home on, and subsequently impact against the ballistic missile. The aircraft uses large optics to track the ballistic missile and designates the payload of the ballistic missile with a laser. The intercepting missile detects the laser illumination with a semi-active laser (SAL) seeker allowing missile to impact on the ballistic missile warhead and destroying the payload.

The present invention employs a vertical or near-vertical launcher to achieve the interceptor performance required to achieve the short time of flight required for success in the ballistic missile defense mission. The invention provides egress assurance mechanisms that provide the missile defense benefit. The invention will also enable a number of additional missions to be executed more effectively or more efficiently by virtue of the increased magazine capacity, mission flexibility and missile kinematic efficiencies of a high altitude aircraft employing a vertical or "near" vertical launcher. The present invention provides egress assurance mechanisms that taken together extend the state of the art to make a vertical launcher practical for aircraft and thus enables these applications to be developed with their attendant efficiencies and cost savings both in individual missile costs and in force structure (number of airplanes) required to accomplish a given mission. Example missions that would benefit from this invention include test target launch, unmanned air vehicle launch, cruise missile launch, air defense missile launch air space denial missions, and others.

The present invention also encompasses a method for launching offensive ballistic and aeroballistic missiles. An offensive missile is first vertically mounted in an aircraft. An emerging target is then detected, identified, and its position determined in Global Positioning System (GPS) coordinates. The vertically-mounted offensive missile is then safely launched through application of one or more egress assurance mechanisms. The offensive missile then flies to the position directed by the aircraft where it releases a precision guided munition (PGM) payload to thereby accomplish a time-critical strike with a reduced number of launching platforms.

The present invention also encompasses a method for launching small satellites into earth orbit. A satellite launch vehicle is first mounted vertically (or at a forward lean angle to accommodate a longer missile) in an aircraft. The aircraft flies to a preferred launch position to yield a desired orbital inclination. The vertically-mounted launch vehicle is then safely launched through application of one or more egress assurance mechanisms. The launch vehicle then executes ascent to an appropriate orbital insertion maneuver and releases the small satellite payload to thereby accomplish a low cost satellite launch. The aircraft can carry a number of launch vehicles and subsequently launch each over a period of time depending on aircraft endurance and thereby insert a small constellation of small satellites for space science, commercial, or space superiority missions.

The present invention also encompasses a method for launching and inserting naval or other mines into a preplanned pattern from great distance using ballistic and aero ballistic missiles. A missile incorporating a mine payload is first vertically mounted in an aircraft. The minefield position is determined in Global Positioning System (GPS) coordinates. The vertically-mounted mine payload missile is then safely launched through application of one or more egress assurance mechanisms. The mine payload missile then flies to the position directed by the aircraft where if releases the mine payload to thereby deploy a minefield without exposing the launch aircraft to hostile defenses.

A method for launching UAVs from great standoff comprising the steps of placing the UAV in a missile bus consisting of a dual-thrust booster with TVC, a GPS-aided INS, a retarding device, a separating shroud, and a UAV initialization device, vertically mounting the missile bus in an aircraft, launching the UAV bus to release the UAV at a prescribed location based on GPS coordinates.

A method for launching a missile having a motor from a launch tube comprising the steps of positioning a self-erecting launch rail slide in the cavity on one side of the launch tube so as to index the missile on loading; igniting the missile motor so that the rail is pulled upwardly by the missile during egress from the launch tube until the rail is stopped by a mechanical limit that also unlatches the rail from shoes attached to the missile and forcing the shoes along the remaining length of the rail until the motor clears the aircraft, whereby lateral tipping motions are prevented.

A method for launching a missile having a motor from a launch tube comprising the steps of positioning rocket nozzles upwind of each launch tube; expelling high-velocity gases from a rocket motor, the missile motor, or some other gas generator through the nozzles adjacent to the launch tube; deflecting the ambient airflow around the missile using the gas flow so created until the missile has egressed from the launch tube; reducing thereby the drag loads on the missile and the resultant tipping forces.

A method for launching a missile having a motor from a launch tube comprising the steps of positioning an erectable deflector upwind of each launch tube; extending the deflector during the launch sequence using motors or hydraulic actuators; deflecting the ambient airflow around the missile using the deflector until the missile has egressed from the launch tube; extending the height protected through the use of high-velocity gas jets mounted in the top of the deflector; withdrawing the deflector back into the launcher; reducing thereby the drag loads on the missile and the resultant tipping forces.

BRIEF DESCRIPTION OF THE DRAWINGS

The present invention is further described with reference to the accompanying drawings, wherein:

FIGS. 3a-3e are schematic drawings illustrating self-erecting guide rails for launch egress attitude control used in a preferred embodiment of the air-based vertical launch method of the present invention;

FIGS. 4a-4g are schematic drawings illustrating fixed tube launcher details used in a preferred embodiment of the air-based vertical launch method of the present invention;

FIGS. 9a through 9g are schematic drawings of alternative embodiments of apparatus for launch egress attitude control (egress assurance mechanisms) used in alternative embodiments for the air-based vertical launch method of the present invention;

FIG. 10 is a schematic drawing of alternative embodiments of apparatus for powering missile launch used in the preferred and in alternative embodiments for the air-based vertical launch method of the present invention;

FIG. 12 is a schematic drawing of alternative embodiments of aircraft apparatus for reducing missile egress loads used in alternative embodiments for the air-based vertical launch method of the present invention.

DETAILED DESCRIPTION OF THE PREFERRED EMBODIMENT

Figure 1:
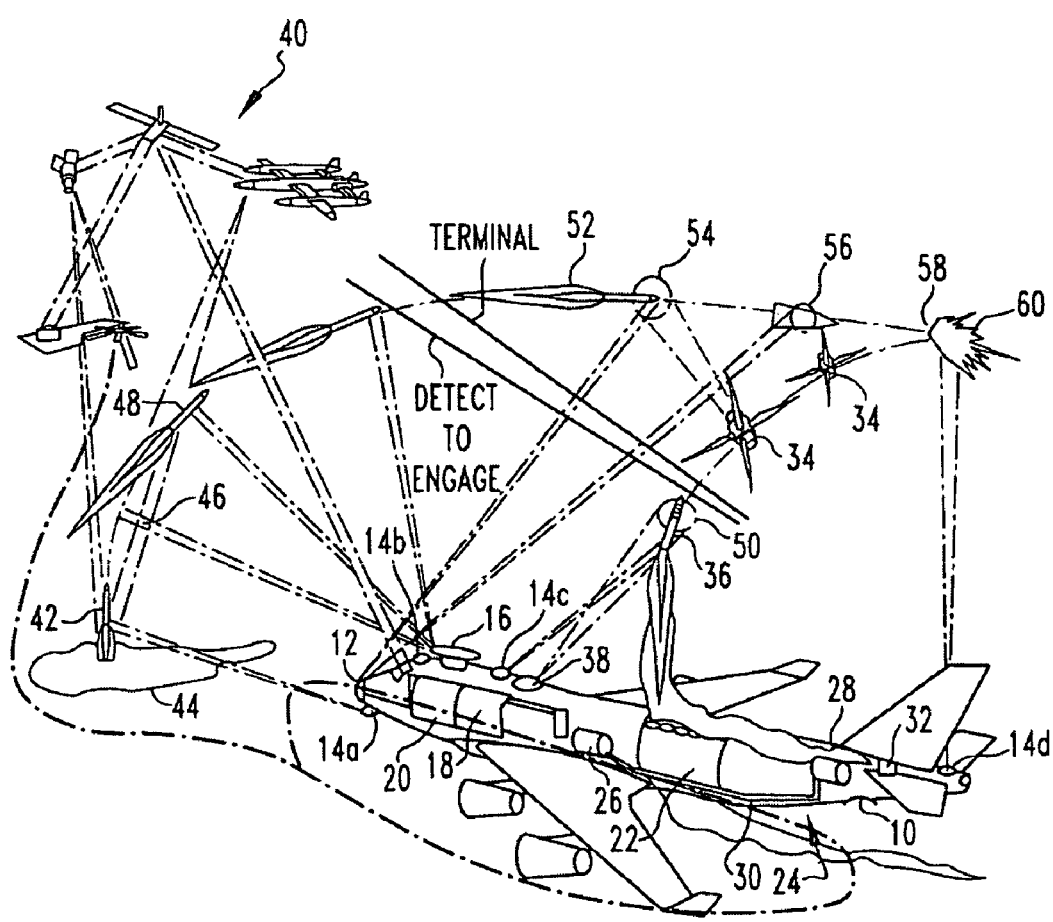
FIG. 1 is a schematic drawing illustrating a preferred embodiment of the operation of the air-based vertical launch ballistic missile defense method of the present invention.

Referring to FIG. 1, the method of the present invention maybe carried out with a jumbo aircraft 10 with air refueling capability. This aircraft is equipped with a laser trader designator 12, an IRST 14 and a laser ranger 16. The aircraft is also equipped with BMC2 and communications; a vertical or near vertical launcher 22, and a ballast transfer system 24. The ballast transfer system includes a tank and pump assembly 26, a aft tank and pump assembly 28, and an intermediate conduit tube between the two tanks. There is also an automatic transient load compensation flight control adjoint 32, an interceptor containing a kill vehicle with a SAL seeker 34, and an interceptor link 39.

Aircraft deploy to theater based on 24 hour warning, establish 1-2 patrols using 3-4 aircraft each. Theater assets detect a threat, and provide a cue via existing and planned BMC2 and communications networks. IRST detects the threat once it rises above clouds or horizon. Once TBM is in track, IRST cues Laser Ranger which acquires and tracks the threat. The aircraft BMC2 Node cues other BMC2 Nodes. IRST, Optics, and Laser Ranger track threat and provide a precision 3-D track (BMC2 passes track to other users through BMC2 network). Node makes engage decision (or accepts engage order), then initializes and tests interceptor to assure it is safe for launch. Interceptor is launched using safe egress apparatus. Ballast transfer system compensates for c.g. shift. Flight control compensates for egress transients. Link antenna acquires and tracks interceptor beacon, establishes interceptor Link, receives tactical TLM. Weapon control updates and uplinks predicted intercept point. Laser Designator Optics allow aim point selection and 3-D track (with Laser ranger). Laser designator illuminates desired hit point on cold body. SAL Seeker detects Laser energy and homes to hit point (even after staging event). IRST provides mission assessment data, cue data for subsequent defense layers FIG. 1 is the general concept of operations for the Air-Based Vertical Launch (ABVL) Ballistic Missile Defense (BMD) concept. The aircraft can utilize launch cues from external sensors to cue onboard sensors or can employ its own surveillance sensors to detect ascending ballistic missiles. The aircraft then employs its laser ranger to acquire and track the ballistic missile and to develop a high-fidelity three-dimensional (3D) track. The aircraft has a battle management command and control ($BMC^2$) system and organization that can receive engagement orders from external $BMC^2$ or initiate engagement under doctrinal control from $BMC^2$ based on external or onboard sensor data. The aircraft can provide its 3D track information to the external $BMC^2$ and other engagement assets through the common $BMC^2$ communications. The aircraft develops a predicted intercept point and upon refining the prediction uncertainty to within the missiles divert range, initializes and launches a missile. The aircraft missile link system acquires the missile and provides up and down communication with the missile. The aircraft continues to track the ballistic missile with a high-fidelity 3D track, providing updates to improve probability of intercept as additional data improves the solution. Before the kill vehicle (KV) seeker initiates search, the aircraft acquires the threat missile using the large aperture laser director optics, selects the aim point, and illuminates the threat with its designation laser. The missile seeker acquires the reflected laser energy and homes to impact on the laser spot centroid. The kinetic energy of the KV at the combined strike velocity destroys the payload. The intercept is observed by the laser designator optics and a Battle Damage Assessment (BDA) report is passed on to subsequent defense layers for further action if required.

Figure 2:
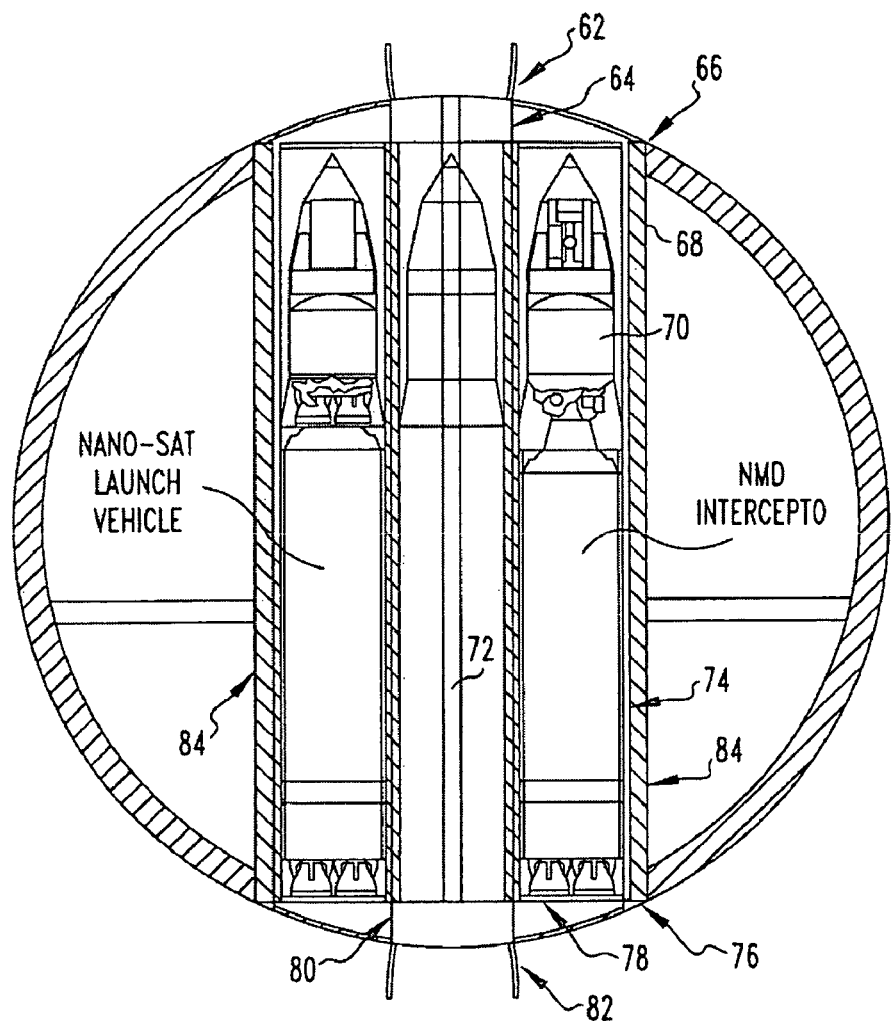
FIG. 2 is a schematic drawing illustrating a preferred embodiment of general launcher design features for an air-based vertical launch ballistic missile defense method of the present invention.
Figure 4F:
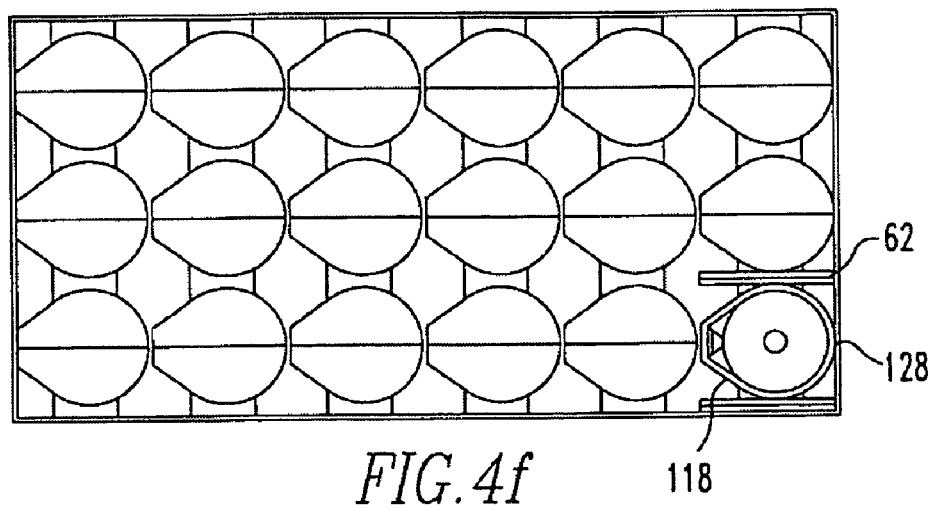
Figure 4G:
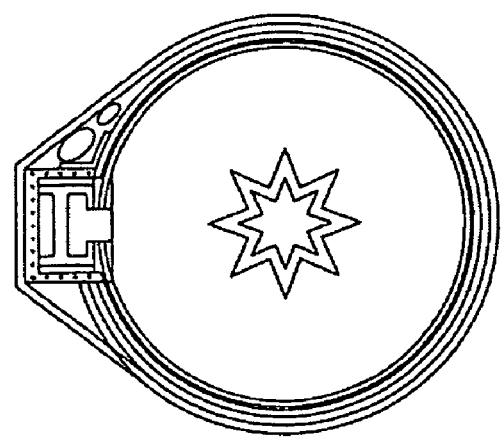
Figure 5A:
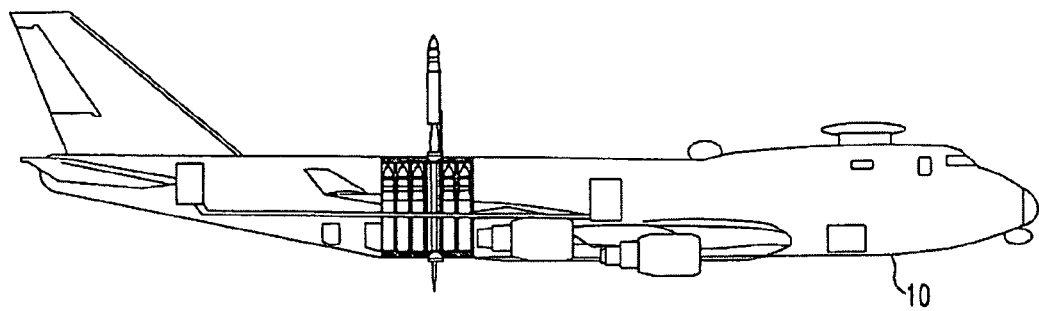
FIG. 5 is a schematic drawing illustrating an air-based vertical launcher general aircraft configuration (Boeing 747-400 ER) used in a preferred embodiment of the air-based vertical launch missile defense method of the present invention.
Figure 5B:
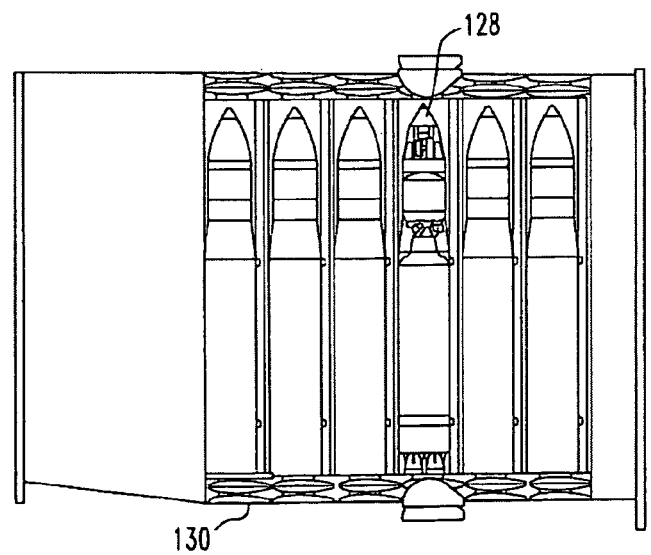
Figure 5C:
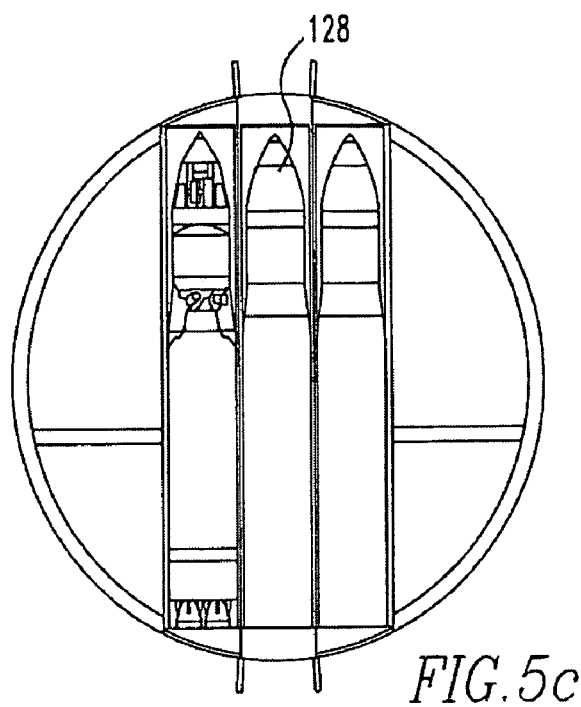
Figure 5D:
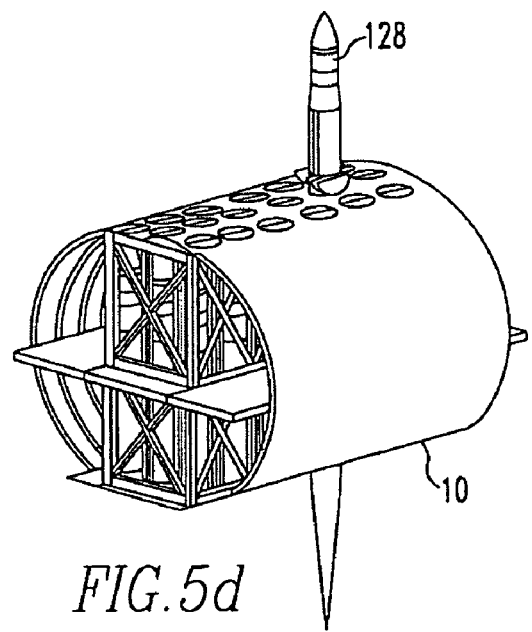

FIG. 2 is an illustration of the vertical launcher in the ABVL BMD application. Referring to FIG. 2, the vertical launcher includes upper doors 62, an ablative upper tube extension 64, an upper aircraft skin 66 with stiffening ablative point, and a plurality of steel launch tubes 68. The missile 70 in a canister fits in the launch tubes. The canister egress rail 72 also fits the launch tube slot. Steel launcher walls 74 provide protection and distribute loads. There is also a lower aircraft skin 76 with ablative stiffening point. The launcher also includes a lower sill 78 with latches, an ablative lower tube extension 80, lower doors 82, and a load distribution structure 84.

The launcher is located aft of the wing carry-through structure and is centered on the aircraft centerline. There is a bottom sill for each canister and this sill includes a restraint that prevents canister motion during aircraft operation, absorbing shock and mitigating vibrations transmitted to the missile. Below each launch tube and canister are two doors opening at the center towards the sides of the aircraft. These doors are quickly opened during missile initialization. The upper doors operate similarly. Failure of any door to open interrupts the launch sequencer, which then selects and initializes another missile. The aircraft skin around the launcher section is stiffened and painted with ablative paints to protect the skin from pressure and thermal loads due to motor ignition and subsequent plume impingement. In this illustration, 18 large missiles (32" diameter) are contained in a vertical launcher section with 6 rows of 3 missiles each. Smaller missiles would allow a significant increase in loadout capacity. The launcher section has protection from shrapnel on all 6 sides. The launch tubes provide additional protection, as do the canisters themselves. The launcher section also provides thermal protection to the missiles within and provides some protection to the aircraft to provide time for aircrew escape in the event of accidents.

Referring to FIGS. 3a-5d, the air based vertical launch canister and rail assembly includes a booster case 86, an upper shoe 88, a canister 90, a rail tank 92, and a rail 94. There is also a slide assembly 96, a detent 98, a motor 100, a Teflon bearing 102; and a mount bracket 104. There is also a slide assembly which includes a rail track 106, a rail 108 and wheels 110. The rail track includes an upper track 112 and a lower track 114. There is also a lower shoe 116. The apparatus also includes a launch tube 118, canister rings 120, a deflector 124 and a space 126. The missile 128 is housed within the canister.

FIGS. 3a-3e illustrate the use of a self-erecting guide rail employed to facilitate missile egress. The guide rail itself has a narrow slot at the lower section and a wide slot in the upper section. The missile has two launch shoes: a narrow one at the aft end of the booster and a wide shoe at the upper end. The spacing between shoes defines the distance between the wide and narrow slots such that the lower shoe is released from the narrow slot at the same instant as the wide shoe is released from the upper slot. This scheme is used in several naval guided missile launchers. The guide rail itself is mounted inside a slot within which it can easily slide. This apparatus is similar in function to a common drawer slide and is capable of handling the missile mass and egress loads (perhaps with wheeled runners). The guide rail is constrained by wedge-shaped nylon pads on either side of the aft launch shoe. When the motor ignites, the rail moves forward with the launch shoe until the rail reaches a stop mechanism near the top of the canister trough. The stop mechanism dampens the impact shock and prevents further upward motion of the rail. At the stop mechanism location the slot is slightly wider, allowing the nylon wedges to spread outward. The aft shoe can then be pressed past the wedges to ride freely up the remaining rail section to the release point. Upon reaching the release point, airflow moving aft over the aircraft pulls the missile free of the rail at both ends simultaneously, minimizing the tip-off that would otherwise be encountered at egress. The rail itself is then retracted back into the canister by a spring that attaches the rail to its original position and that was extended by force from the motor thrust during extension of the rail. A stopper dampens the impact of the rail as it returns to the bottom of the track and captures the rail to prevent rebound. This same latch is used to prevent missile motion in the canister at times other than launch and is mechanically released during the launch sequence prior to motor ignition. If release doesn't occur, the motor ignition is prevented by the launch sequencer, which then selects and initializes another missile. A vertical launcher is to be fitted into an existing aircraft to provide for efficient launch of missiles intended to intercept ballistic missiles. FIGS. 4a-4g illustrate details of a preferred embodiment of an ABVL using fixed array of launch tubes. The vertical launcher consists of hollow steel (or other suitable material) tubes that serve to direct the rocket motor exhaust products out through doors on the bottom of the fuselage and directs the missile through doors fitted on the top of the fuselage. Each missile is fitted in a launcher tube. A collection of tubes (array) may be located close together as near the aircraft c.g. as possible given existing aircraft structures and equipment (as illustrated in FIG. 5 for a Boeing 747-400 ER aircraft). The vertical launcher tubes and doors minimize the ignition shock and mass flow effects on the aircraft. The aircraft structure in the vicinity of the vertical launcher will be stiffened and coated to deal with pressure and thermal effects due to motor plume impingement upon egress. The collection of tubes comprising the launcher will be enclosed in steel (or other material) bulkheads to provide protection to the missiles from external hazards and to isolate the launcher from surrounding aircraft spaces.

Figure 6:
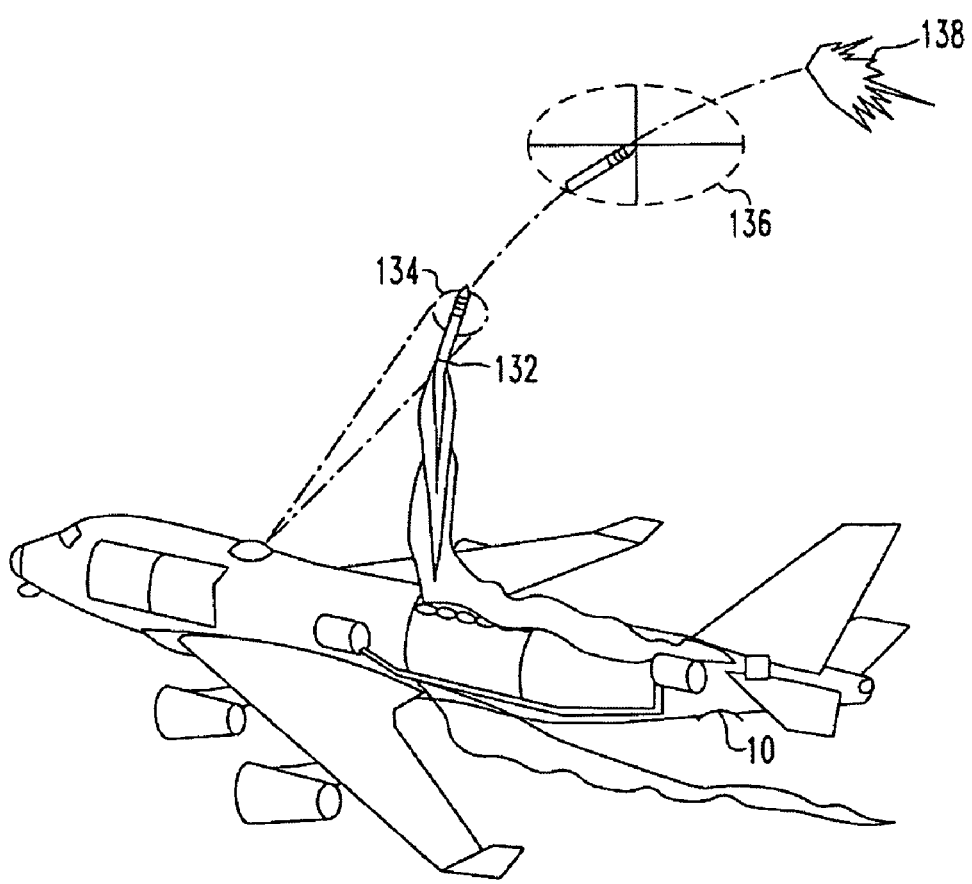
FIG. 6 is a schematic drawing illustrating a preferred embodiment of the general sequence of operations of the air-based vertical launcher method of the present invention.

FIG. 6 illustrates the general sequence of operations for an aircraft equipped with a vertical launcher in the preferred embodiment. Referring to FIG. 6, an aircraft is deployed to be theater based on 24 hr warning, establishing 1-2 patrols using 3-4 aircraft each. An Aircraft Battle Management Command and Control establishes communications with force BMC2. The BMC2 makes engage decision, issues launch order. Weapon control determines launch safety and hazard areas for booster impact and failure mode trajectories. Missile selected, initialized, pre-launch operability tested (new missile selected if test fails). The launcher doors open and dual thrust booster ignited. Egress assurance mechanisms operate to ensure missile and aircraft safe operation. The ballast transfer system rapidly pumps water from forward tank to aft tank to compensate for c.g. shift (returned later in consort with a/c fuel transfers). Adjunct aircraft flight control anticipates, compensates for egress transients (plume impingement, airflow disruption, c.g. motion) and missile stabilizers deploy (if used). Missile. TVC provides safe egress to planned thrust ramp-up condition at position 13w. Missile booster ramps up to full thrust. At position 134 a link antenna acquires and tracks the missile beacon, establishes a missile link, and receives tactical TLM. The weapon control updates and uplinks predicted intercept or payload release point. A missile flies to payload release window 136 using GPS aided INS guidance, linked updates, and TVC or aerocontrol and the payload completes its mission a position 138. A launch controller will communicate with all missiles to monitor health and to initiate and launch missiles under the direction of a weapon control system. A pair of water tanks and a pump is employed to rapidly counteract the effect of missile launch on the aircraft c.g. The launch controller automatically pumps water from a tank ahead of the c.g. to a tank far aft in the aircraft during launch. This flow can be used in combination with the existing aircraft fuel redistribution system to maintain desired c.g. limits for stability and control. In addition, the transient loads on the aircraft due to the launch event will be predicted based on measurement of the flight conditions at launch and will be automatically compensated for by an automated flight control system adjunct to the existing flight control system. The transient loads include ignition shocks, pressure loads, plume impingement loads, and airflow-disruption-derived lift and drag changes. These transients will be predictable based on missile motor characteristics and aircraft flight conditions. Aircraft inertia characteristics are expected to mitigate response to these transient loads but automated response is preferred to manual pilot compensation. The automated system can also compensate for loads induced under a low probability adverse event, such as a restrained firing, in which the missile might not release from the rail. Those skilled in the art will, however, appreciate that, as a worst-case design consideration, both aircraft control and launcher thermal protection will be structurally capable of ensuring aircraft survival despite such an event.

Individual missiles are contained in canisters (FIGS. 4a-5d) that serve as shipping containers and as launch tubes. The guide rail (FIGS. 3a-3e) may be required to facilitate missile egress from the aircraft. The guide rail must be deployed rapidly into the air stream above the aircraft, must be capable of resisting air loads and dynamic loads imparted by the missile as it exits, must release the missile with minimal tip-off, and must be retracted into the aircraft after launch, allowing launcher doors to close and seal the aircraft. It may be possible to deploy and retract the rail using conventional motors in the time required for the ABVL BMD mission, however, a self-erecting rail is proposed to ensure that the guide rail extension does not delay launch. Each canister incorporates the self-erecting launch rail as well as connectors to the missile and front and aft closures that protect the missiles but allow egress upon launch.

The self-erecting launch rail slides in a cavity outside the forward side of the canister (FIGS. 3a-3e) and this cavity fits inside a cavity on the front side of each launch tube. These fixtures serve to index the missiles on loading. Upon missile motor ignition, the rail is pulled upward by the missile during egress until it is stopped by a mechanical limit that also unlatches the rail from the shoes attached to missile structural frames at the top and bottom of the booster motor. The interceptor momentum and motor thrust then force the shoes along the remaining length of the rail until the motor exhaust nozzle clears the aircraft fuselage and launcher door tops. At this point, the shoes exit the rail guides simultaneously at the top and bottom shoes (as is done in conventional naval guided missile rail launchers). The rail prevents the lateral tipping moments (derived from airflow over the launcher) from causing excessive structural loads on the aft end of the missile and prevents a significant tip-off that would degrade missile controllability at egress. The rail is mechanically pulled back after egress and the upper and lower doors are closed. Exhaust products from the rocket motor are purged by cross flow through the tube after missile exit as the launch rail is retracting and before the doors fully close.

After egress, the missile is controlled by a thrust vector control (TVC) or similar device attached to the missile booster. The missile autopilot achieves a flight path selected to assure stability while minimizing plume impingement on the aircraft until safe separation has been achieved. In addition to normal operation considerations, the planned missile flight path is also selected such that possible missile failure modes result in missile trajectories that are safe for the launch aircraft and aircrew. Egress safety is assured through the combination of multiply redundant flight-critical equipment, automated pre-launch missile functional operability testing, and physical design of the missile for stability and predictable flight path even should all controls fail subsequent to passing operability tests.

During flyout to the safe separation point, the aircraft establishes uplink and downlink communication with the missile. The links allow weapon control updates based on precision track of the ballistic missile to be sent to the missile, allow evaluation of missile health, and serve to improve the fire control solution based on actual (instead of nominal a priori) missile performance. The missile is then commanded to an appropriate heading and flight path angle to best achieve intercept based on the fire control solution passed to the missile upon initialization. With vertical (or near vertical) launch, missile maneuvers to a desired flight path angle will on average be significantly smaller than for horizontal launch. Since all missile maneuvers derive from propulsive energy, reducing these maneuvers results in higher missile burnout speeds and improved system performance.

In order to minimize structural modification to the aircraft and to minimize transient impacts on aircraft stability and control, it may prove appropriate to achieve missile egress at lower thrust (and thus lower mass flow rate) than needed for the rest of boost. If this is the case, egress would employ either a dual-thrust (low, then high) booster or a small ejector motor capable of getting the missile to safe separation conditions for full thrust. If "cold launch" is employed, the missile must be controlled using aerodynamic surfaces or with a rocket-based attitude control system until booster motor ignition since TVC would not be available through the booster. The ignition of the booster must then be achieved ensuring that no ignition debris is ejected towards the aircraft. Further, the flight path of the missile must assure that no collision with the aircraft can occur should the booster fail to ignite.

The preferred seeker to be employed in ABVL BMD is a semi-active laser seeker. This seeker allows the weapon control system on the launch aircraft to designate the desired impact point on the target with a laser such that the ballistic missile payload is destroyed by direct impact at intercept (FIG. 1). The aircraft laser designator has optical resolution adequate to ensure the designation of the threat payload at ranges consistent with the defense missile intercept range. Preliminary calculations indicate that the 1.5 m optics employed by the Airborne Laser (ABL) Ballistic Missile Defense System would be more than adequate for intercepts at distances greater than 1000 km from the designating aircraft. For the ABVL application, optics as small as 70 cm may be adequate. The laser designator spot size need not be smaller than about 1 m at the target range since the seeker will aim at the centroid of the illuminated portion of the threat. Designation laser power and semi-active laser (SAL) seeker sensitivity coupled with engagement geometry, target geometry, and target materials will determine the required spot size. Details of this analysis have not been done, but the ABL designation laser and optical system would appear to have the performance required to support the proposed ABVL BMD system.

Those skilled in the art will appreciate that the ABVL BMD method has the following unobvious advantages.

Air-Based Vertical Launch

ABVL results in surprising and unanticipated beneficial results regarding missile propulsion efficiency and hence missile size for a given intercept condition. This is in addition to the expected benefits of improved capacity and operational flexibility.

BACKGROUND

Air-based launch provides benefits of reduced atmospheric density and hence drag losses on missile performance. A horizontal launch, however, requires the aircraft to be generally aimed at the desired target or requires the missile to use propulsive energy to redirect its trajectory after launch. If the aircraft must be turned to a new heading, significant delay (10's of seconds to minutes) is incurred which must be made up through increased propulsion in the missile. If the missile is released on the wrong heading, a delay will be required (~5 sec or more) before the commencement of a maneuver in order to allow for safe separation from the aircraft to preclude potential collision. If the missile is released before motor ignition, further delays will be incurred. For a horizontal drop, this may add an additional 3-5 sec to time of flight. For parachute drop, this addition may be >5-10 sec. If a particular intercept point is required (particularly the last effective intercept point), then each delay translates into a demand for a greater average velocity which also translates to greater burn-out velocity. For a given size payload, the increased demand in speed translates to a bigger propulsion system. Since aircraft payload is usually limited, bigger missiles mean fewer missiles.

Vertical launch confers several advantages. First is an increase in missile packing density and thus aircraft capacity. Second is the elimination of several delays in the launch sequence, which require greater propulsive energy. Third is the rapidity with which the missile reaches a desirable ascent altitude and the reduced time it takes to get to any given altitude. The reduced time to altitude means more of the propulsive energy can go into acceleration of the mass rather than fighting drag at lower altitudes. Even with a low-thrust egress, vertically-launched interceptors use the initial low-thrust phase to turn the missile to the proper flight path angle commensurate with missile control (30-40 degrees) above the aircraft nose. The desired flight path angle to the predicted intercept point is established after booster thrust ramp-up. Fourth is the ability to use the aircraft to provide environmental protection for the missile prior to launch (as compared to external launch configurations with comparable ignition timelines). For example, a 5-sec delay in launch sequence requires a 6% increase in velocity and a 12% increase in missile weight for a particular intercept condition (range, altitude, and time available). A 10-sec delay requires a 12% increase in velocity and a 35% increase in missile weight.

Considerations:

Air basing has been considered for ballistic missile defense using horizontal launch including powered launch, drops, and parachute extraction. All of these methods have serious consequences on engagement timelines and missile propulsion. The size of the missile propulsion and inefficient horizontal orientations seriously limit missile-carrying capacity for an individual aircraft. As a result, multiple aircraft must be airborne at a given defense point to provide capacity and coverage. All of these factors drive the total cost of a given level of defense.

Since surface ships employ vertical launchers for ballistic missile defense, the use of a vertical launcher is not novel. Translation to aircraft may have been contemplated but several complications have prevented serious consideration, in part because the unanticipated benefits were not understood, and in part because the consequences of delays have not been examined. Egress mechanisms that make vertical launch from an aircraft practical make this solution novel.

It is important to note that a horizontal launch using parachutes to retard the missile and achieve vertical orientation before ignition has been proposed. This is not vertical launch within the meaning of this application.

First, most missions do not require the timeliness required for BMD. Alternately, missions (such as air-to-air intercept) that do require such timeliness, generally have the aircraft oriented towards the target. This is not possible for most BMD scenarios because the launch location may not be known beforehand and because the aircraft must perform some type of orbit to hold its desired position for long periods of time. Under nominal conditions the threat launch will occur at a random time in the orbit and the average offset angle is likely to be ~90°. Under the worst of conditions, an enemy may observe the aircraft orbit and fire when the offset angle is ~180°.

In order to achieve vertical (or near-vertical) launch, there are several technical challenges to be met. First is protection of the aircraft structure against the transient effects of missile egress and rocket exhaust. Second is the ability to protect the missile structure against tipping forces that occur upon egress at high aircraft speed. Third is the ability to control the missile's orientation after egress but while the missile is flying at high aerodynamic angle of attack. Fourth is the ability to overcome safety concerns for ignition of a rocket motor inside the aircraft.

Naval ships have had to solve all these problems in order to exploit the advantages of vertical launch technology. There is a difference in degree however for the tip-off forces and for the missile stability and control. The aircraft vertical launch system employs a self-erecting rail to aid egress, reduce loads due to tipping moments, and to facilitate control authority in the missile during maximum angle of attack. Alternate apparatus for egress control have also been invented and presented herewith. The final preferred apparatus will be determined through expensive tests not possible at this stage of invention.

Semi-Active Laser Seeker (SAL)

The SAL seeker employed in ABVL BMD results in surprising and unanticipated beneficial results regarding missile propulsion efficiency and hence missile size for a given intercept condition. These benefits are in addition to the intended benefits of lighter weight and lower costs for laser seekers relative to infra-red (IR) seekers, lower complexity for guidance algorithms and thus software costs, and better hit locations resulting in enhanced lethality without the need for a kill enhancement device (KED).

BACKGROUND

SAL seekers exist in many smart weapon applications. Their use in BMD applications has been considered, but the focus has been on IR seekers and radar seekers, both of which have high costs relative to SAL seekers.

Because the ABVL platform can employ passive IR detectors and a laser ranger for 3D track of the ballistic missile, the engagement timeline can be compressed relative to other basing modes that depend on external sensors to detect and track ballistic missile threats. Aircraft sensors provide the accuracy to point large-aperture optics at the boosting threat, to resolve the threat at great range. These optics allow the aircraft to select the proper aimpoint and eliminate the need for the missile to make this determination at the last moment. Late aimpoint selection is a significant risk for IR seeker guided missiles. If not achieved, the IR seeker will result in an adverse hit location from the perspective of payload destruction. If achieved, the kill vehicle must still maneuver to move from the long-range aimpoint to the desired hit point. This can demand high thrust and impacts the KV mass and cost.

The SAL seeker has the proper aimpoint for the entire homing period, eliminating the late transients that create miss distance and drive the need for a KED. Thus the SAL seeker reduces the mass and complexity of the KV by avoiding the coolant system weights demanded for IR seekers, reducing propellants needed for maneuvering, and by eliminating the need for any ICED and the propellants needed to maneuver the additional KED mass. In addition, because the aircraft track of the ballistic missile payload has "information inertia" that allows the correct object to be tracked after burnout of the threat motor, intercepts can be achieved after boost has ended even if countermeasures are deployed. This has the unintended consequence of significantly extending the available engagement space with ABVL BMD relative to other guidance modes. Because the engagement window can extend past burnout, SAL guidance affords ascent phase intercept to the limits of the defense missile velocity advantage. Because the efficiencies of vertical launch and SAL allow a given missile to achieve a greater burnout velocity than for alternative approaches, more threats and circumstances can be covered.

Considerations:

Active lasers have been proposed for ballistic missile defense as directed energy weapons, as fuse sensors, and as seekers.

In the case of laser seekers, the proposal has been made to employ a laser on the KV itself and to have the laser sensor then home on the target. This scheme is unlikely to be capable of directing the KV to the desired aim point since doing so requires the KV guidance to be intelligent. In addition, it is unclear how the narrow laser beam can find the target in the first place or be held on the target through KV maneuvers, transient flight events, or in the presence of countermeasures.

In ABVL BMD operation, the air platform has the means of holding the designating laser on the correct portion of the target. The laser seeker on the KV need only be smart enough to find the laser spot and home to its centroid.

For the purpose of using a high-energy laser (HEL) to designate a target to an IR seeker by heating the target to a specific temperature and uplinking the expected temperature to the defense missile, this scheme enables the intelligent ABL aircraft to employ its HEL in support of subsequent defense layers in the event that the threat ballistic missile is too far away for the HEL to be directly lethal or in the event that a target cannot be engaged before end of boost due to firepower or capacity of the HEL. This scheme represents an alternative defense mode for cooperative engagement between ABL and either ABVL or subsequent defense layers, especially if intercepts by subsequent defenses will occur after the threat complex evolves.

Air-Based Vertical Launch for Offensive Missiles

Figure 7A:
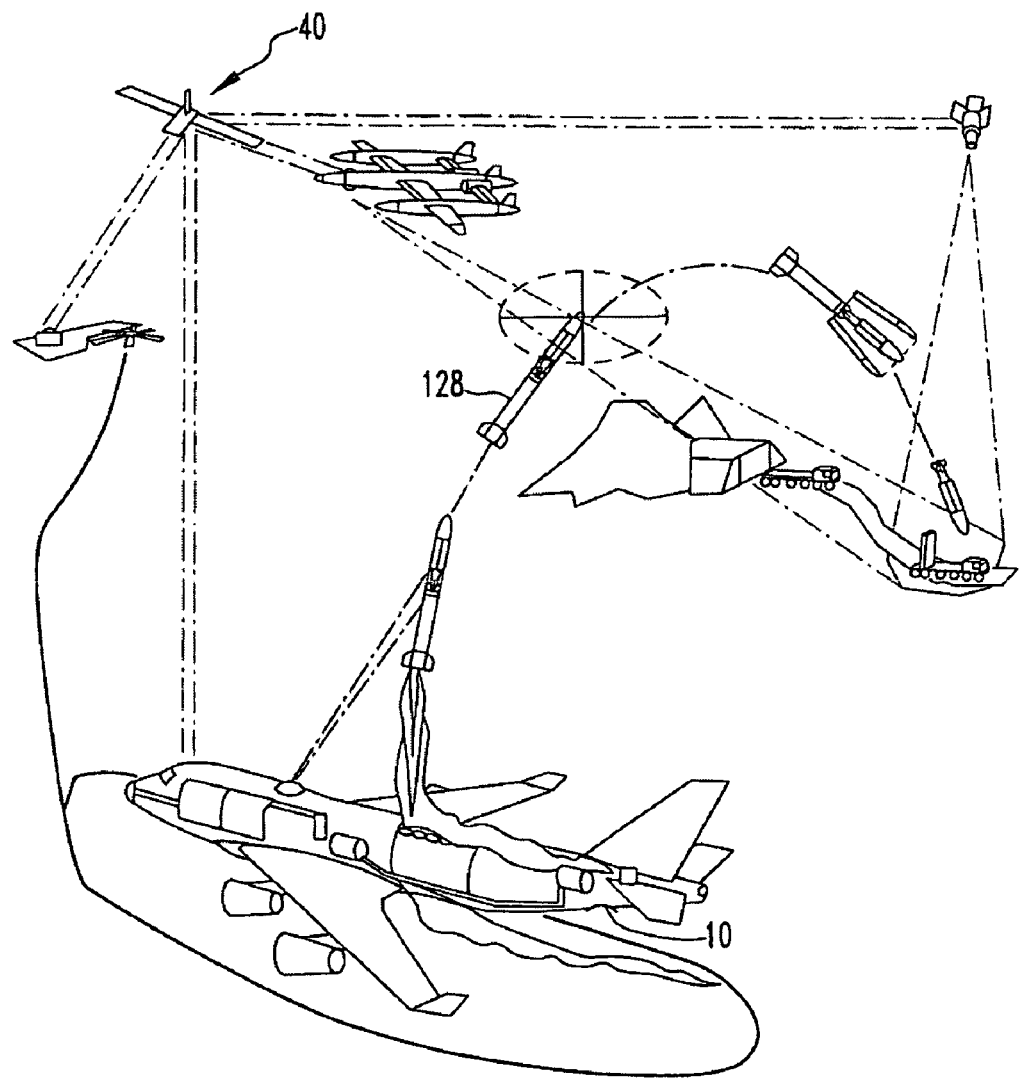
FIGS. 7a and 7b are schematic drawings illustrating a time-critical strike in a preferred embodiment of air-based vertical launch method launching offensive missiles of the present invention.
Figure 7B:
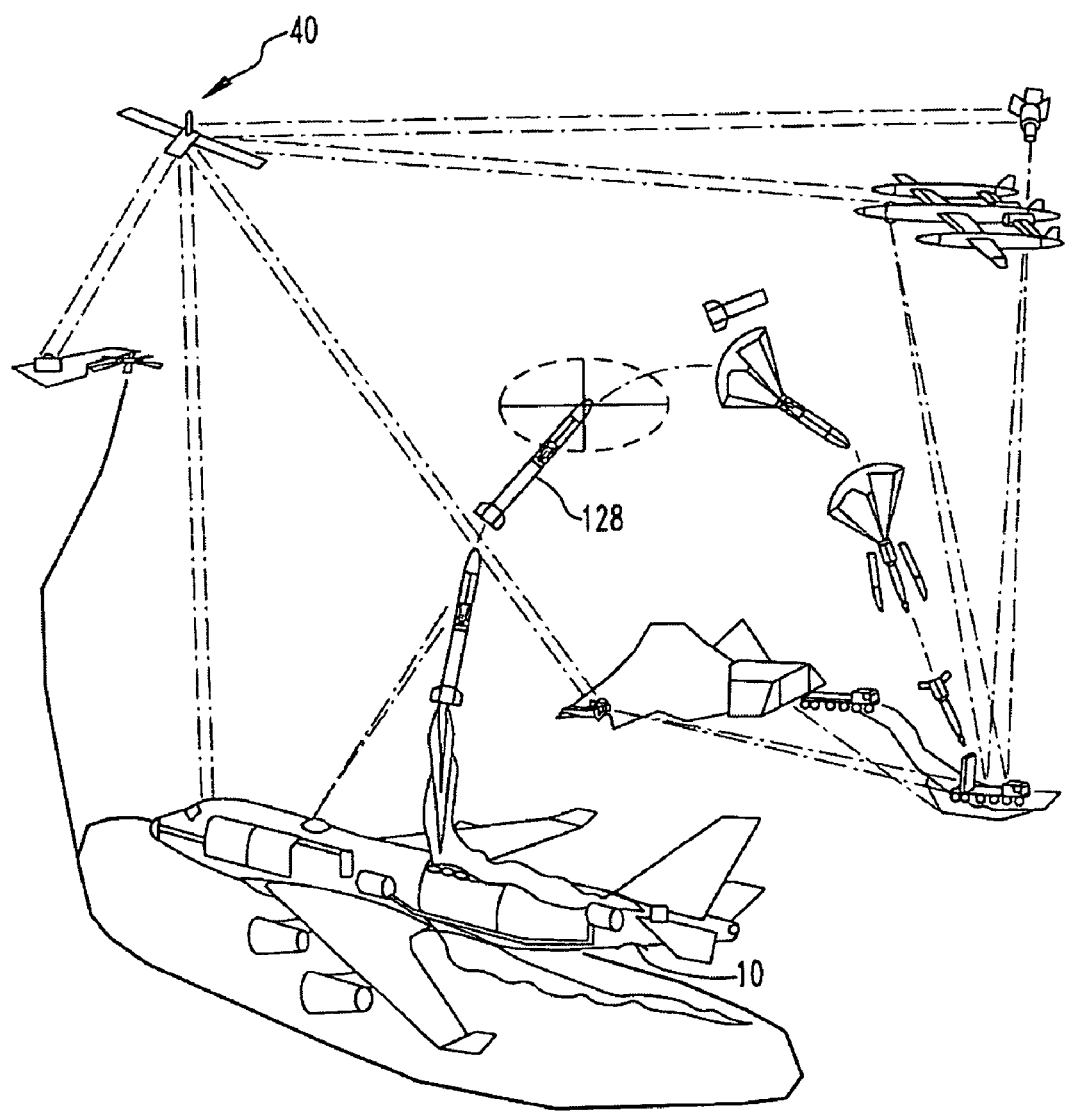
Figure 8A:
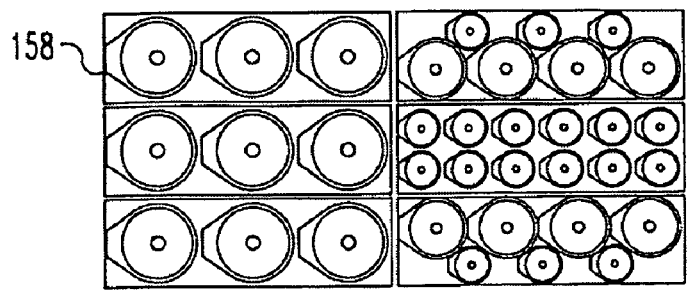
FIG. 8 is a schematic drawing of an alternative modular embodiment of the air-based vertical launch method of the present invention.
Figure 8B:
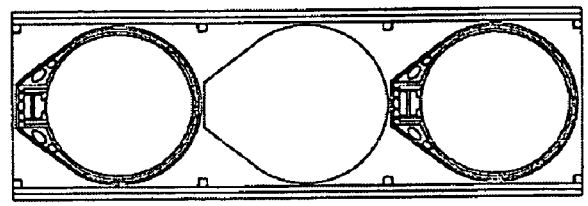
Figure 8C:
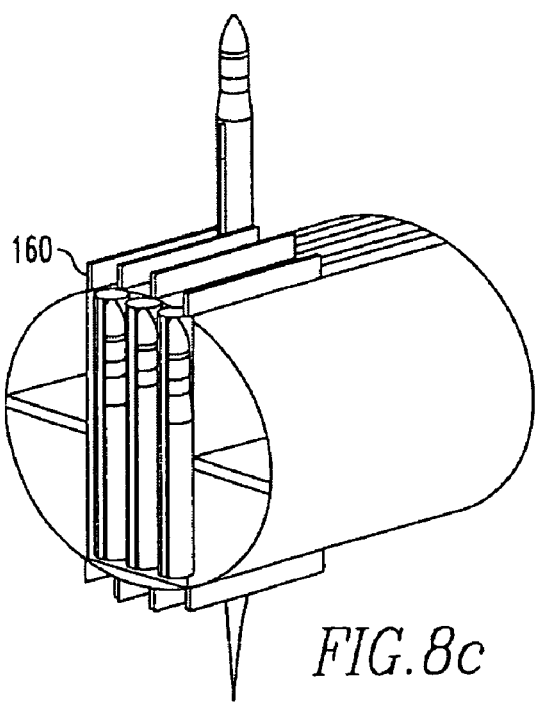
Figure 8D:
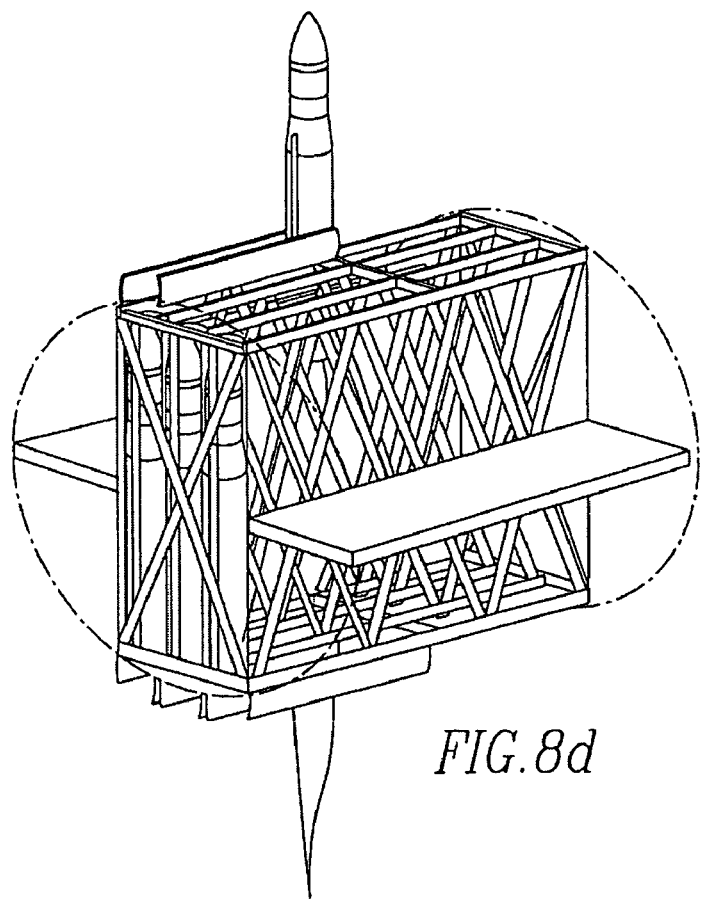
Figure 8E:
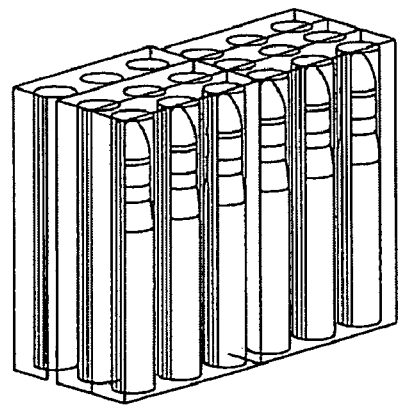
Figure 8F:
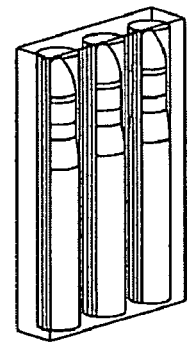

The ABVL system can also be employed for offensive missiles in the case of time-critical strike missions as well as other offensive missions as illustrated in FIGS. 7a and 7b. For time-critical strike, the problem with existing solutions is the delay between recognition of an emergent target and time-on-target for a weapon. Use of conventional weapons and launch platforms results in large numbers of platforms to distribute weapons around the battlefield such that at least one is in a favorable position when a threat emerges. Employing a vertical launcher in a widebody aircraft and using ballistic missiles to provide extended range coverage with short flight times allows one or two aircraft to service a large number of potential time-critical targets or to attack many less time-critical targets in coordinated fashion. An ABVL aircraft would contain 32 or more strike missiles capable of impacting targets at ranges of 500 miles or more from the aircraft at times less than 10 minutes after target recognition, including delays for communications, engagement decisions, and missile initialization. The strike missile time of flight would be minimal based on peak velocities as high as 7 km/s depending on payload size. Assuming a 2000-lb class Joint Direct Attack Munition (JDAM) weapon as the payload, a 24-inch diameter booster stack could achieve a 3-4 km/s burnout velocity with an overall missile length of 20 feet including a protective shroud for the JDAM weapon. The protective shroud shields the JDAM from high temperatures during acceleration and re-entry. The missile flight would be based on Global Positioning System (GPS) targeting. The missile would initialize the JDAM in the same manner as an aircraft so that release from the ballistic missile would appear to the JDAM to be similar to release from an aircraft, albeit at potentially higher speed. The missile might employ a slowdown maneuver and deploy a retarding device to ensure JDAM release at close to conventional conditions depending on the cost tradeoffs for hardening JDAM versus retarding the missile. Other payloads could include a laser-guided bomb for close air support and a submunition payload for area targets. The ABVL aircraft could potentially serve both offensive time-critical strike and defensive BMD roles simultaneously given adequate capacity and a mixed missile load. The dual mission capability significantly improves the affordability and operational flexibility of the ABVL platform. Aircraft stationing would likely be driven by the need to conduct ballistic missile defense from favorable locations consistent with aircraft survivability considerations. Offensive missile reach would be adjusted through missile design to achieve the desired hostile country coverage from the TBMD stations. Additional console and land attack communications links would be incorporated into the ABVL BMC$^2$ system to provide for offensive operations.

Referring to FIG. 7a, a case is illustrated where no retardation would be required. In this case, aircraft deployed to theater based on 24 hr warning. Then 1-2 patrols are established using 3-4 aircraft each. Theater assets detect time critical target, and collect GPS location. Theater assets team pass time critical target ID and GPS location to ABVL TCS C2. Theater C2 selects target for action and issues engagement order to TCS ABVL aircraft. Aircraft C2 receives EO, assesses engageability and deconflicts airspace, responds with comply/can't comply. Aircraft C2 Node accepts engage order thereby initializing and launching the missile. The missile is initialized, launcher doors open, and dual thrust booster. The TVC provides safe egress, and ramps up to full thrust. The link antenna acquires and tracks missile beacon, establishes missile link, receives tactical TLM. Weapon control then updates, uplinks predicted intercept point. Boost using bus GPS Guidance. In-flight updates are provided until burnout (command destruct capability until PGM separation). A slow-down maneuver is conducted if necessary to meet release conditions. There is then a handover from bus GPS guidance to PGM GPS guidance with GPS update from aircraft, followed by shroud separation, PGM payload release and PGM terminal flight using GPS guidance. Targeting assets can also provide re-engagement decision data.

Referring to FIG. 7b, a case is illustrated with retarded payload release. Aircraft deploy to theater based on 24 hr warning then 1-2 patrols are established using 34 aircraft each. Theater assets detect time critical target and collect GPS location. Theater C2 selects target for action and issues engagement order to TCS ABVL aircraft. Aircraft C2 receives EO, assesses engageability and deconflicts airspace, responds with comply/can't comply. ABVLTCS C2 Node accepts engage order), initializes and launches missile, alerts force to trajectory. The missile is initialized and launcher doors open and a dual thrust booster is used and TVC provides safe egress, ramping up to full thrust. A link antenna acquires and tracks missile beacon, establishes missile link and receives tactical TLM. Weapon control then updates and uplinks predicted hand-over point. Boost is accomplished using bus GPS Guidance. In flight updates are provided until burnout (command destruct capability until SAL PGM separation). Ballistic flight (or aero-ballistic) is then accomplished, after which a slow-down maneuver is accomplished if necessary to meet release conditions. The booster then separates and the drogue deploys. Handover from bus to SAL PGM guidance with final update is accomplished after which the shroud separates and the drogue released. The forward observer (or UAV) selects the aim point and uses laser designator to illuminate desired hit point. SAL PGM terminal flight using SAL guidance. The weapon impacts near laser spot within lethal radius. The forward observer then provides mission assessment data, cue data for subsequent engagement.

Several methods/apparatuses for egress control may be used with the method of this invention. These methods include hot plume diversion of airflow (concentric or offset), cold plume diversion of airflow, egress rail-mounted airflow deflector, launcher-erected deflector, fuselage-mounted airflow deflector (including fairings), fixed-rail square-tube canister, and inclined launcher (with or without rails)—all used in combination with dual-thrust booster, two-pulse booster, kick motor, hot gas generator, cold gas generator, or airbag-type ejector to initially clear the missile out of the aircraft.

A fixed tube array is the preferred embodiment of the launcher due to its simplicity relative to integration with the aircraft. However, mission flexibility may demand a modular launcher that can employ a variety of missile types and easily be reloaded to enable fast turn-around of an aircraft. FIG. 8 illustrates one such design. A modular launcher may also allow incorporation of longer missiles (at the expense of quantity) by leaning missiles forward in the individual modules. Referring to FIGS. 8a-8f, Six rectangular modules in structural grid translates loads to aircraft structure. The exterior grid continues forward and aft of launcher section. The modules latch at top and bottom through open doors. Module doors hinge parallel to aircraft body centerline. Door opens over whole module as with a bomb bay door. The top of each canister must withstand plume impingement from adjacent rounds (fly-through cover). This arrangement simplifies upper and lower extensions by using rectangular sections with structure to attach doors. Extensions are also coated with ablatives for thermal protection. Launcher door actuators located in upper and lower extensions.

FIG. 9a illustrates an airflow deflector erected during launch by the aircraft. The deflectors are located in a cavity just upstream from each missile launch tube. An electric motor or hydraulic actuator erects the deflector during the launch sequence. The deflector is retracted as soon as the missile clears the launch tube. The deflector shields the missile from the most severe egress loads until it can employ control to compensate. The advantage of the launcher-erected deflector is that no rail or gas diversion mechanisms are required. The disadvantage is the weight of the deflector and erecting mechanisms and the impact on packing density due to the form factor of the deflector. Erection of the deflector is expected to produce a transient (<2 sec) drag load of up to 10,000 lbs on the aircraft.

Referring to FIG. 9b, an alternate egress apparatus is shown wherein a hot plume diversion utilizes a portion of the booster gases to impart a high-velocity airflow upstream of the launch tube on the upper fuselage. This high-velocity flow diverts the free stream airflow around the missile body and greatly reduces the drag force and resulting pitching moment until the missile has cleared the top of the aircraft. At this point, the missile TVC can control the missile and compensate for cross-flow drag and pitching moment through the rest of the flight. The plume is diverted by partially closing the aft end of the launch tube to increase pressure within the canister. A portion of the gases is diverted under this pressure through a tube (or tubes) on the front side of the launch cylinder up to ports at the top of the fuselage. Supersonic nozzles designed for the expected range of operating pressures accelerate the diverted gases to high velocity. The high-velocity flow perpendicular to the aircraft velocity is "opaque" to the airflow and causes it to divert around both the jet plume and the missile emerging just behind the jet plume. The flow will be complex and has yet to be characterized in Computational Fluid Dynamics (CFD) codes. In principal, however, the high-velocity plume can shield much of the missile presented area from the ambient airflow and thus greatly reduce the egress transient loads and motions. The pressure in the launch cylinder will vary as the missile moves up the tube. As a result, the flow up the tube will eventually diminish. Significant design effort will be required to optimize this approach. A variable diameter opening may be required at the bottom of the launch tube to maintain adequate pressure to provide the desired plume velocity and height over the aircraft. In addition, the flow exhausted below the aircraft might need to use a nozzle to offset the thrust generated by the jets at the top of the fuselage. While FIG. 9b illustrates one tube with several supersonic nozzles, the actual preferred arrangement may include one two-dimensional nozzle covering the front of a cell and may not require an actual nozzle depending on the flow velocity and its ability to deflect the airflow.

Referring to FIG. 9c, a related apparatus would use a concentric tube outside the canister to divert a portion of the exhaust gases back to the top of the aircraft. A convergent-divergent annular nozzle would be used at the top of the cylinder to provide a sheaf of high-velocity gases around the missile as it emerges. A convergent-divergent nozzle would be used at the bottom of the cylinder to provide compensating thrust at the bottom of the aircraft and to keep the concentric tube adequately pressurized. The illustration employs several conventional nozzles rather than a single annular one. The actual nozzle configuration will be resolved with FCD analysis and optimization of flow.

FIG. 9d illustrates a cold (or warm) gas system for achieving the desired airflow deflection. Here a single source is used to generate the desired gas pressure. A manifold system is used to flow the gas to the desired launch tube. Complexity of the manifold system is expected to be the principal issue with this approach. The principal advantage is that it does not require additional motors or significant diversion booster exhaust products. Again, no rail is required. Also the same discussion of nozzle configuration applies: the actual optimal configuration will be derived through CFD analysis.

In order to provide a steady diversion flow, it may be desirable to install hot gas or even cold gas generators ahead of each launch tube. FIG. 9e illustrates the use of several small solid rocket motors upstream of the launch tube to achieve this goal. These motors would be ignited during the launch sequence at the time appropriate to minimize the egress loads on the missile. Burn times would be ~1 sec, beginning ~0.25 sec after booster ignition. A low-cost motor such as the 70 mm Hydra rocket motor could provide this divert flow. The motors would fit on the forward side of the launch canister and be loaded with the all-up round into the aircraft. The thrust generated by the small motors is expected to be small enough that compensation will not be necessary for a large aircraft. Again, CFD analysis will be required to tune this design for alternative missiles, but the advantage is that no rail would be required.

FIG. 9f illustrates a hybrid approach of the launcher-erected airflow deflector (from FIG. 6a) topped with a high-velocity plume to shield the whole missile. In this case, the airflow deflector covers approximately half of the exposed missile. The motors are installed inside the fairing at its top. The motors are fired as the missile emerges, shielding the top of the missile until it has cleared the aircraft.

FIG. 9g illustrates a fixed launch rail in a square canister. This canister may be vertical or it may lean forward in the aircraft. Slots on the leading side of the canister keep the missile from pitching back until the front shoes leave the slot. The missile accelerates quickly such that the aft shoes exit ~0.25 sec after the front shoes. The pitching moment on the missile through this time generates only a small angular change for the missile body (1-2 deg) even though the rate may be significant (20-25 deg/sec). Since there is clearance between the missile and the aft side of the canister, the missile tail section does not need to be structurally capable of dealing with a 100,000 ft-lb bending moment. In the case of a forward-leaning launcher, the lean angle can be used to partially compensate for the initial tip-off motions. The added advantage of a square canister is that aerodynamic surfaces can be accommodated without folding. This simplifies egress for missiles needing aerodynamic surfaces for stability and/or control. The potential disadvantage of square launchers includes form factor and packing density issues and difficulty of incorporating gas diversion techniques discussed above.

FIGS. 10a-10d illustrate hot and cold launch alternatives considered appropriate for ABVL. The preferred method is hot launch by a dual thrust motor for large missiles and a full thrust motor for smaller missiles. Iris expected that motor thrust of 20,000 lbs or less will require modest protection for the aircraft structure. Significantly larger motors will likely require significant protection increases or a low-then-high thrust profile as previously described. A motor that burns for ~1 sec and then shuts down may get the missile out of the aircraft with sufficient velocity to allow flight to a desired safe separation for re-ignition. While still in the canister, thrust can be significantly higher than 20,000 lbs. For a motor with 40,000 lbs thrust and a missile weighing 8,000 lbs, the motor would burn for 0.56 sec (to burn out before the nozzle exits the aircraft) and the missile would depart the airplane at 72 ft/sec. While this velocity would allow the missile to clear the tail, it's too low to preclude fallback before safe separation; apogee would be 80 ft (40 ft above the tail). In general, higher thrust (~100,000 lbs) would be needed and for shorter durations (0.33 sec) to yield ~200 ft of clearance before booster ignition. Inclined launchers or fairings that extend acceleration distance make short-pulse motors somewhat more attractive (+5 ft of travel adds 20 ft of clearance in the vertical case above). Short durations make 2-pulse or ejector motor rocket propulsion less desirable (and less achievable) and forces consideration of other techniques such as airbag ejection, hot gas ejection, cold gas ejection, or gun launch.

A desirable safe separation is ~200 ft above the aircraft with positive upward velocity and stable orientation. This condition requires egress at ~120 ft/sec if there is no propulsion after egress. Achieving this velocity requires about 9 g's of acceleration through the 20 ft launch tube. It also requires aerodynamic stability and control or other attitude control systems during the coast to booster ignition. Gun launches provide 100's of gees of acceleration but are incompatible with the large missiles here considered due to structure and instrument survivability. Average pressure in the tube for cold or warm gas launch or for airbag launch must be 18,000 lbs/ft$^2$, a difficult value for a tube volume of ~111 cu ft. In addition, these egress alternatives require the aircraft to absorb the needed momentum transfer (~975,000 ft-lb/sec). Thus, a dual-thrust launch appears to be the preferred egress technique for air-based vertical launch of large missiles.

Referring to FIG. 10a, a missile 140 is shown being launched from the aircraft 10. There would be local blast and thermal protection 142 on the aircraft and straight through recoil-less exhaust 144. Either a hot launch or a cold launch could be employed. A small ejector motor could also be used.

Referring to FIG. 10b, a hot launch missile 146 is shown. With this missile there would be full ignition inside the aircraft so that suitable structural protection would be required as for example, by providing increased structure in the launcher area to resist blast, shock and mass flow impingement. Suitable thermal additives, points, tiles and high temperature allows may also be used. The dual thrust booster provides a low initial burn rate which reduces blast shock thermal and erosion loads.

Referring to FIG. 10 c, a missile 148 is shown. this missile is equipped with a dual thrust booster provides a slow burn rate.

Referring to FIG. 10d, a missile 150 with a small ejector motor 152 may be used. Such a missile, achieves safe separation before main motor ignition, reduces protection needs, and reduces transients. It will be appreciated that this embodiment requires attitude control during coast and requires a safe post separation trajectory.

Referring to FIG. 10e a cold launch missile 154 with an analog 156 or gas container may be used. This missile requires a delayed igniter, attitude control during coast, and structural stiffening to absorb momentum transfer. The embodiment would minimize transient aerodynamics.

Figure 11A:
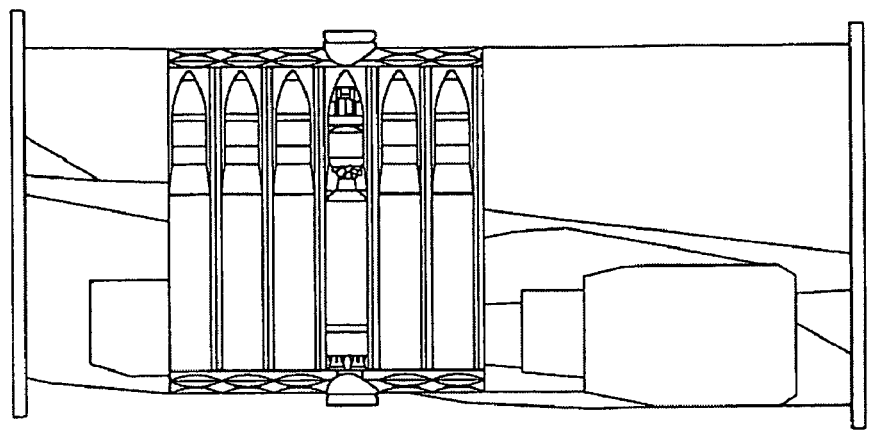
FIG. 11 is a schematic drawing of alternative embodiments of tilted launcher apparatus for reducing missile egress loads used in the preferred and in alternative embodiments for the air-based vertical launch method of the present invention.
Figure 11B:
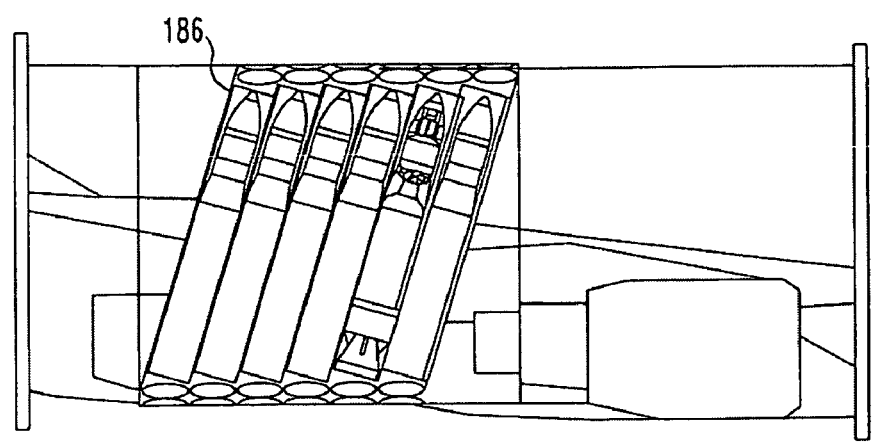
Figure 11C:
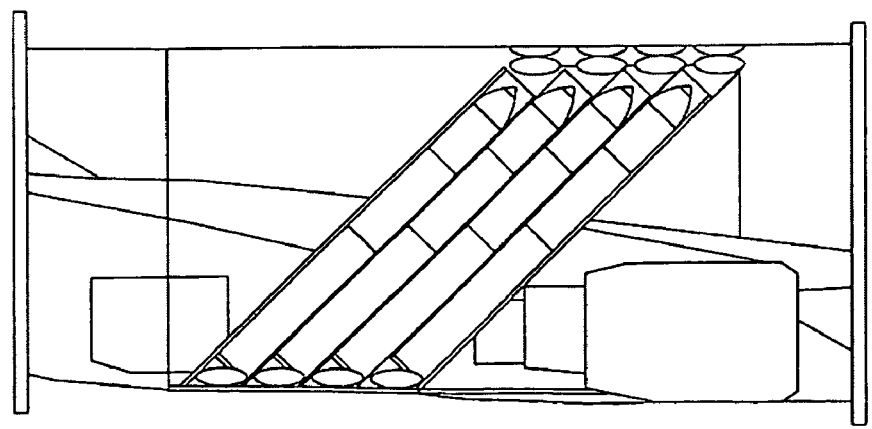
Figure 11D:
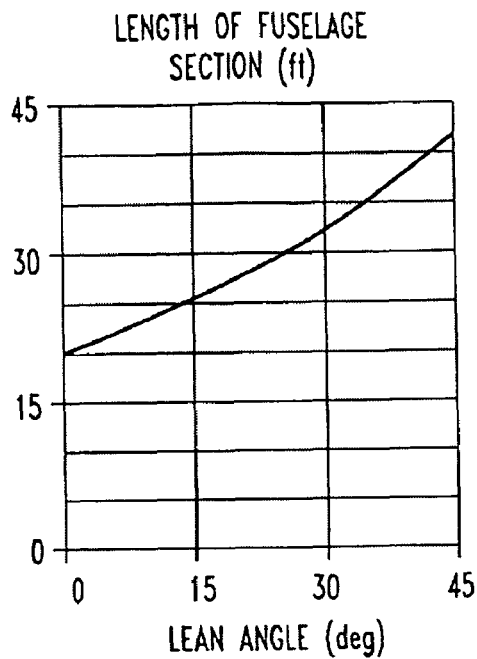
Figure 11E:
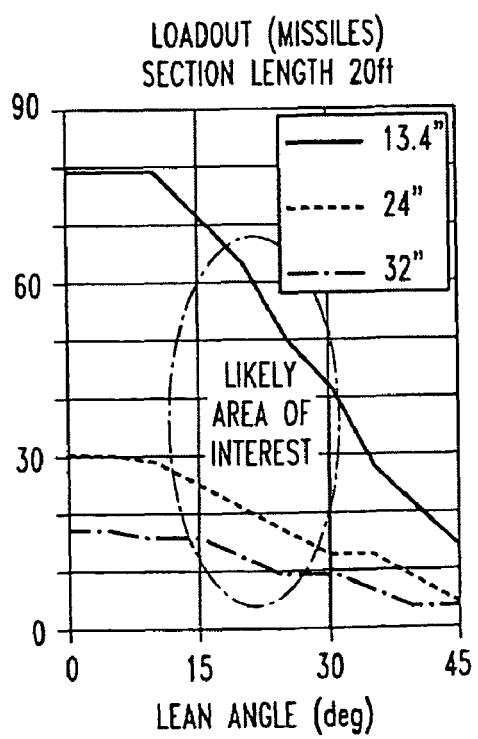

FIGS. 11b-11c illustrate forward-leaning launchers from vertical to ~45 degrees forward of vertical (all considered vertical or "near-vertical" in this invention context) as compared to the vertical arrangement shown in FIG. 11a. Forward lean reduces egress loads on the missile by reducing angle of attack and presented area. However, forward lean increases the size of the launcher and or reduces the number of missiles that can be carried in an upward firing launcher. In addition, leaning the launcher makes insertion of missiles much more complex. Initial analyses of the benefits of launcher lean do not reveal significant value compared to the preferred method of vertical launch. However, a near vertical launcher with ~15-20 degrees lean may still obtain the other benefits of vertical launch such as rapid selection of mission-specific missiles, rapid recovery from a missile fault at initialization, and perhaps only modest loss of space in the aircraft and modest increase in the difficulty of loading the aircraft.

Whether cost savings from the reduction in egress loads compensates for the cost impacts of these minor degradations is still to be determined.

FIGS. 12a-12c illustrates several configurations for fixed airflow deflecting fairings. These have the disadvantage of producing drag throughout flight but have the advantage of always being present. Effectiveness of fixed fairings and deflectors for reducing airflow-induced loads and transient motion on ABVL missiles is not expected to warrant their cost in aircraft performance. Long endurance of the aircraft is a significant factor in providing defense or offense where the target emerges at unknown times over long periods of deployment (months).

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for launching UAVs from great standoff comprising the steps of:
   placing the UAV in a missile bus consisting of a dual-thrust booster with TVC, a GPS-aided INS, a retarding device, a separating shroud, and a UAV initialization device,
   mounting the missile bus in an approximately vertical position in an aircraft,
   launching the missile bus to release the UAV at a prescribed location based on GPS coordinates.

2. The method of claim 1 wherein the missile bus is vertically mounted.

3. The method of claim 1 wherein the missile bus is mounted in a tilted position.

* * * * *